US010011409B2

(12) United States Patent
White

(10) Patent No.: US 10,011,409 B2
(45) Date of Patent: Jul. 3, 2018

(54) DEVICE FOR SECURING POSTS TOGETHER

(71) Applicant: ONESTEEL WIRE PTY LIMITED, Sydney (AU)

(72) Inventor: Mark White, Sydney (AU)

(73) Assignee: Onesteel Wire Pty Limited, St. Leonards, New South Wales (AU)

( * ) Notice: Subject to any disclaimer, the term of this patent is extended or adjusted under 35 U.S.C. 154(b) by 0 days.

(21) Appl. No.: 15/033,744

(22) PCT Filed: Oct. 30, 2014

(86) PCT No.: PCT/AU2014/001023
§ 371 (c)(1),
(2) Date: May 2, 2016

(87) PCT Pub. No.: WO2015/061835
PCT Pub. Date: May 7, 2015

(65) Prior Publication Data
US 2016/0280434 A1    Sep. 29, 2016

(30) Foreign Application Priority Data

Oct. 30, 2013  (AU) ................................ 2013904198
Dec. 3, 2013   (AU) ................................ 2013904680

(51) Int. Cl.
*B65D 67/02*    (2006.01)
*B65B 27/10*    (2006.01)
(Continued)

(52) U.S. Cl.
CPC .............. *B65D 67/02* (2013.01); *B65B 19/34* (2013.01); *B65B 27/10* (2013.01); *E04H 17/261* (2013.01);
(Continued)

(58) Field of Classification Search
CPC ................................ B65B 27/10; E04H 17/00
(Continued)

(56) References Cited

U.S. PATENT DOCUMENTS 575,073 A  *  1/1897  Smith .................... E04H 17/10
                                                   256/57
807,414 A  *  12/1905  Berntson ................ E04H 17/12
                                                   256/56
(Continued)

FOREIGN PATENT DOCUMENTS

AU   2013100033    2/2013
WO   2011/032221   3/2011

OTHER PUBLICATIONS

International Search Report and Written Opinion for Application No. PCT/AU2014/001023 dated Jan. 8, 2015 (12 pages).
(Continued)

*Primary Examiner* — Paul T Chin
(74) *Attorney, Agent, or Firm* — Michael Best & Friedrich LLP

(57) ABSTRACT

A device for securing two or more posts together is disclosed. The device comprises a first end that can be passed through the post apertures, that is also configurable to prevent the first end from being withdrawn through the apertures, and a second end adapted to prevent the second end from passing through the apertures. The device may be reusable or non-reusable. A handle for use in moving a bundle of two or more posts is also disclosed. The bundle may have been formed with the device, or in another manner. The device and handle may be separate components or integrally formed. Systems and methods employing the device and/or handle are also disclosed.

19 Claims, 13 Drawing Sheets

(51) Int. Cl.
*F16B 7/00* (2006.01)
*B65B 19/34* (2006.01)
*E04H 17/26* (2006.01)
*F16B 7/04* (2006.01)
*E04H 17/00* (2006.01)

(52) U.S. Cl.
CPC ............... *F16B 7/00* (2013.01); *E04H 17/00* (2013.01); *F16B 7/0433* (2013.01); *Y02W 30/807* (2015.05)

(58) Field of Classification Search
USPC .......... 294/132, 158; 256/10, 57, 56, 59, 62, 256/71, 65.01, 68
See application file for complete search history.

(56) References Cited

U.S. PATENT DOCUMENTS

| | | | | |
|---|---|---|---|---|
| 837,365 | A * | 12/1906 | Wilson et al. | E04H 17/08 256/21 |
| 1,158,957 | A * | 11/1915 | Bates | B65D 63/12 24/27 |
| 1,268,167 | A * | 6/1918 | Shoecraft | E04H 12/2215 248/156 |
| 1,965,899 | A * | 7/1934 | Lambert | F16G 11/12 254/234 |
| 2,564,029 | A | 8/1951 | Peterson | |
| 2,732,176 | A * | 1/1956 | Martin | F16G 11/12 24/132 R |
| 2,844,449 | A * | 7/1958 | Alpert | C10L 1/18 44/387 |
| 3,146,993 | A * | 9/1964 | Kelsey | E04H 17/266 294/132 |
| 4,190,234 | A * | 2/1980 | Coleman | E04H 17/10 254/232 |
| 4,346,871 | A * | 8/1982 | Mauduit | E04H 17/10 174/163 F |
| 4,671,724 | A * | 6/1987 | Bolton | B65G 59/063 221/283 |
| 4,896,402 | A | 1/1990 | Jansen et al. | |
| 5,195,727 | A * | 3/1993 | Liao | A01K 3/00 248/66 |
| 6,293,521 | B1 * | 9/2001 | Parrish | A01G 17/08 254/199 |
| 7,210,427 | B1 * | 5/2007 | Dillman | A01K 1/03 119/512 |
| 7,774,905 | B2 | 8/2010 | Geiger | |
| 2001/0053509 | A1 * | 12/2001 | Ricchio | C21D 9/0025 432/247 |
| 2003/0006404 | A1 * | 1/2003 | Monaghan | E04H 17/266 256/37 |
| 2005/0061924 | A1 * | 3/2005 | Boyle | A01K 3/00 248/49 |
| 2005/0268982 | A1 | 12/2005 | Lile | |
| 2011/0162171 | A1 | 7/2011 | Gmeilbauer | |
| 2012/0061636 | A1 * | 3/2012 | Williams, Sr. | E04H 17/16 256/64 |
| 2015/0082742 | A1 * | 3/2015 | Catt | A01G 17/14 52/835 |

OTHER PUBLICATIONS

Australian Patent Office Examination Report No. 2 for Application No. 2014344792 dated Mar. 14, 2018 (5 pages).

* cited by examiner

Figure 1B     Figure 1C

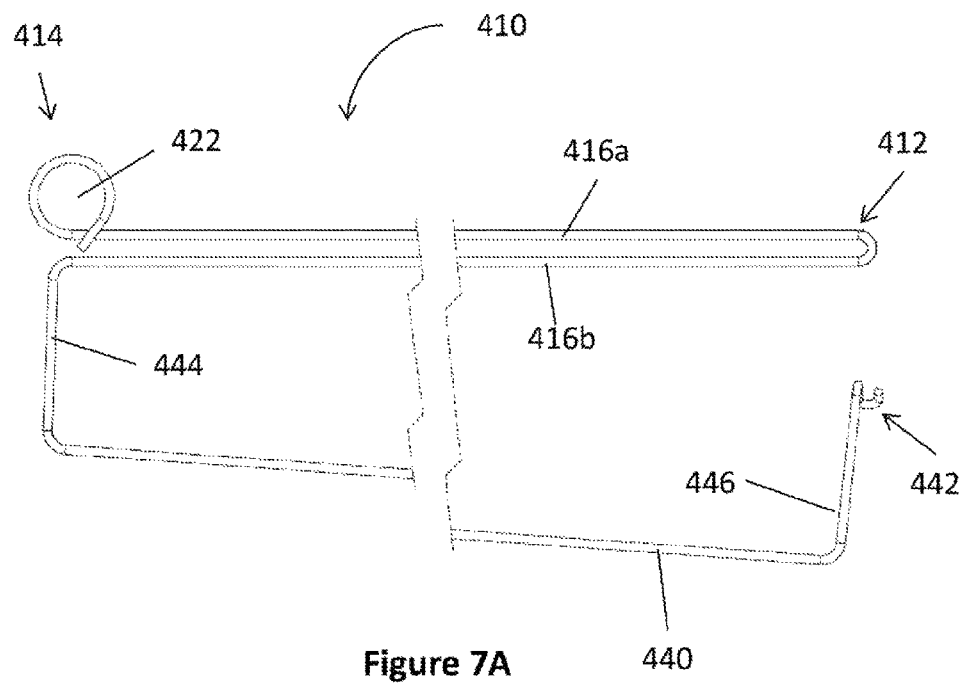
Figure 7A
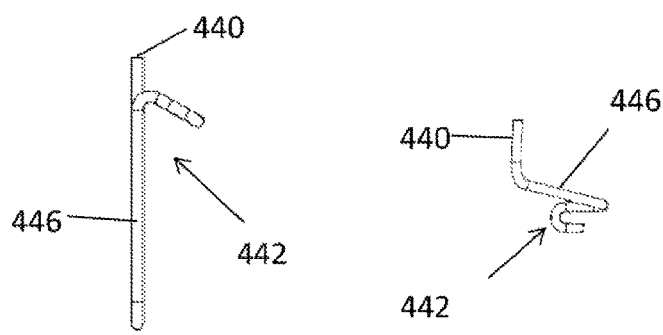
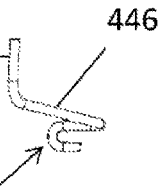
Figure 7C
Figure 7B

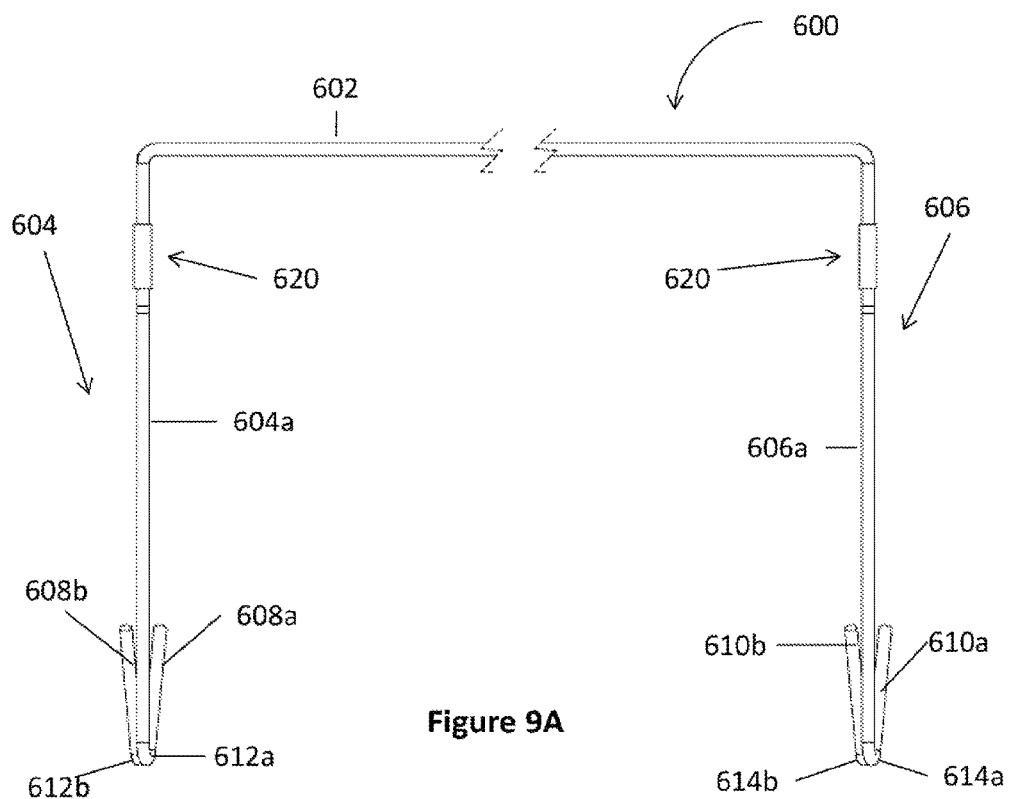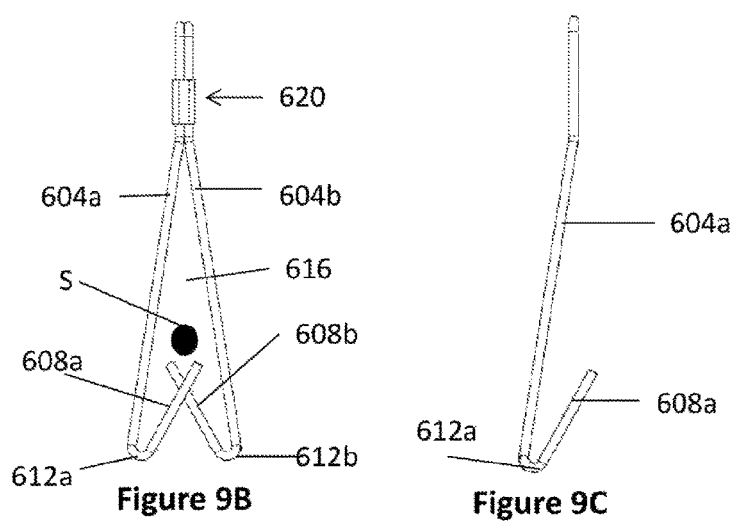
Figure 9A
Figure 9B
Figure 9C

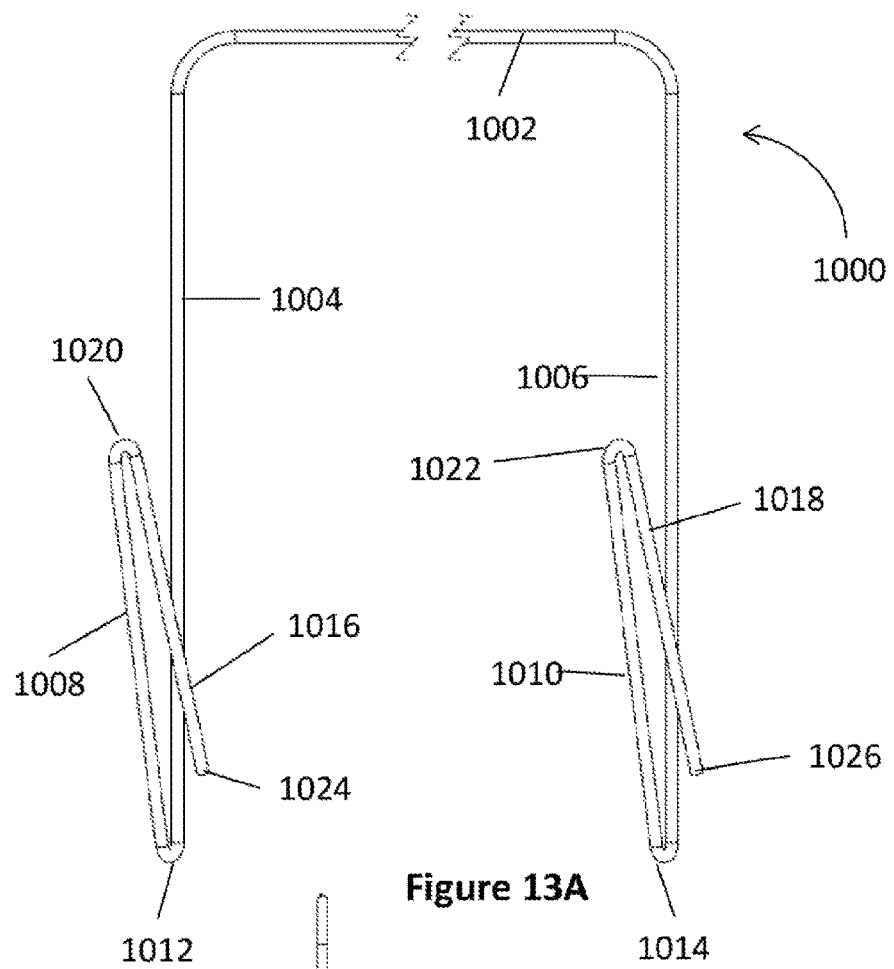
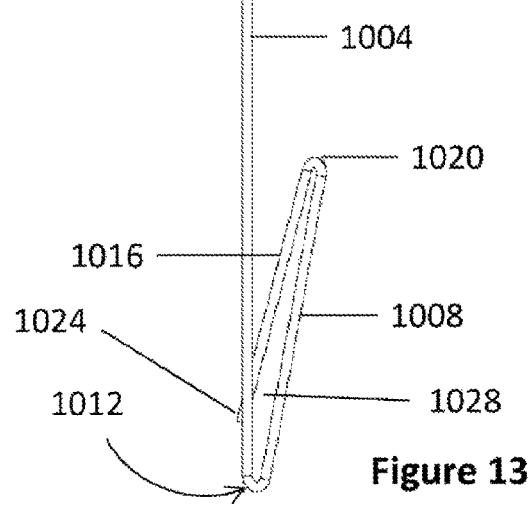
Figure 13A
Figure 13B

DEVICE FOR SECURING POSTS TOGETHER

TECHNICAL FIELD

A device, method and system are disclosed for securing two or more posts together. A handle and system for use in moving a bundle of two or more posts are also disclosed. It should be appreciated that the device, method, handle and system are not limited to post applications, but may be employed in the securing and moving of other elongate objects.

BACKGROUND ART

Fence posts and the like, due to their shape, are often difficult to store and transport. A thin piece of wire can be used to tie a small bundle of posts together. Each post forming part of the bundle is threaded onto the piece of wire (i.e. the wire is threaded through a hole in the post) and the wire is then tied off at the outer posts, thereby forming the small bundle of posts. However, when this bundle is being stored or transported the posts will tend to move along the wire. This can cause kinks along the length of the wire which can make unpacking of the bundle quite difficult and time consuming, requiring the aid of good tools and wire cutters to enable the kinked wire to be removed from between the posts. Further, movement of the posts along the wire forms awkward bundle shapes which can make stacking of the bundles for storage or transport difficult, due to the resulting inconsistent trapezoidal shape. The bundles can also look untidy, as there is no uniformity between the bundles, and there are excessive amounts of the thin ductile wire that is used for tying off the bundles extending out and beyond the bundles.

Other storage and transport solutions have been proposed, such as crates or trays, but these options are generally quite bulky and heavy, leading to an unnecessary increase in transport costs due to the increased weight and reduced number of posts able to be transported. One such transport cradle is disclosed in AU2013100033. The ends of each bundle of posts are covered with a capping material and clamped closed. However, once one end cap has been removed, and/or a single post has been removed from the bundle, the remaining posts become looser in the bundle, and one post may work its way out of the capping unless the cap is bolted back on, which may not be easy to achieve.

Of particular concern is a fence post becoming separated from the bundle. This presents a major safety concern, as the post may dislodge from the bundle and spear, for example, a driver of a vehicle. It may not only be the driver of the transport vehicle, but the post may become loose and spear an occupant of a vehicle following the transport vehicle on the road, or a pedestrian.

The above references to the background art do not constitute an admission that the art forms a part of the common general knowledge of a person of ordinary skill in the art. The above references are also not intended to limit the application of the device, handle, system and method as disclosed herein.

SUMMARY

Disclosed herein, in a first aspect, is a device for securing two or more posts together. In this regard, the two or more posts secured together may be considered to be a bundle of posts.

The posts are of a type that comprise at least one aperture therethrough. Optionally, the posts may be of a type comprising at least one elongate flange that projects out from a longitudinal axis of the post, and the at least one aperture may be formed in the elongate flange. The posts may have up to three (or more) elongate flanges and may take the form of a Y- or T-post. The flange in which the aperture is located may comprise a stalk or stem of the Y- or T-post (although other flanges of the post may instead be employed). Further, an end of the post may be pointed to take the form of a stake or picket for driving into the ground.

The device of the first aspect comprises first and second ends, with an elongate portion extending between the ends. The first end is able to be passed through the post apertures, such that the elongate portion extends through aligned apertures of adjacent posts. The second end is adapted to prevent the second end from passing through the apertures. The first end is configurable whereby the first end is prevented from being withdrawn through an aperture through which it has already been passed. This differs from the currently used wire, as the device has a second end which has been adapted to specifically prevent the second end from passing through the apertures.

There are two main forms of device in the first aspect, reusable and non-reusable. In this regard, the non-reusable devices must be sacrificed or destroyed, such as by cutting or deforming, to allow the posts to be removed therefrom, which prevents their being used more than once. The reusable devices, on the other hand, have a first end that is configurable to have two different, but reversible, configurations: one where the first end is passed through the apertures; and the other where the first end cannot be passed or withdrawn through the apertures.

As it will be appreciated, the length of the elongate portion, and the configurations of the first and second ends, may be dependent on the intended application, and specific dimensions of the posts to be secured together.

In some forms, the first end may be directly configurable (e.g. when the device is sacrificial), such as by being shaped to deflect to allow the first end to pass through an aperture in one direction, but to deflect back (e.g. so that the first end is longer than the aperture) to prevent it from being withdrawn.

In other forms, the first end may be indirectly configurable (e.g. where the device is reusable) in that it may pass through an aperture in one orientation but, as the first end, or device, is altered to a different orientation, then the first end can be prevented from being withdrawn. Alternatively, the first end may interact with an external component to prevent it from being withdrawn. In both of these cases, configurability of the first end can be reversed, thus providing reusability of the device.

The above disclosed device can allow a number of posts to be more safely and neatly secured together. This may be particularly noticeable when posts of the type comprising at least one elongate aperture therein, such as an obround slot, are being secured together. Further, when the location of the slot is closer to a stem of the post, this can improve the alignment of the slots in adjacent posts, when compared to a traditional post having a round/circular hole, and can provide an increased packing density of approximately forty percent. In this regard, adjacent posts can have their profile inverted whilst still allowing the slots in adjacent posts to be aligned. For example, a series of Y-posts may be aligned by first placing five Y-posts so that their so-called wings are arranged edge-to-edge on a surface, such as the ground. Four Y-posts can then be arranged such that their stalks are positioned on the wings of the edge-to-edge adjacent five posts, with the wings of each of the four Y-posts resting on the stalks of the edge-to-edge adjacent posts. A final post can be positioned on an outer post in a similar manner. This arrangement creates an improved packing density.

The device may be typically formed from a metal such as steel, aluminium, etc, or may comprise a plastic. For example, the device may be formed from a 'range 2' spring steel, although other suitable material types may be employed.

The 'range 2' spring steel provides a relatively high yield strength so that the steel can be bent or twisted during use and yet still return to its original shape. It can also provide sufficient rigidity to minimise the amount of unwanted or unintended bending or twisting, unlike the thin ductile wire currently used, thereby preventing kinks forming between adjacent posts and reducing the time needed to unpack the posts.

The device, depending on the material type from which it is formed, may be optionally galvanised or coated. Such coatings may be air dried, force cured, or comprise thermal diffusion coatings.

In one form, the device may further comprise a fastener. In this regard, the first end may be configurable such that, when the first end interacts with the fastener, it is prevented from being withdrawn through an aperture through which it has already been passed. The fastener may, for example, be a pin, clip, staple, or plug, etc, that is larger than the aperture, thus preventing the first end from being withdrawn when it interacts therewith. In this regard, the fastener may act as an anchor, which can be removed when it is desired to separate the posts in the bundle. Such a fastener may be employed with a number of differently configured first ends, and may not only be limited to the reusable-type of device. For example, the fastener may be an additional securing feature to provide added peace of mind for a user, or the fastener may be used to secure an end of the device that has been cut to allow some of the posts to be removed, but that still has posts remaining thereon. In this regard, the fastener may be positionable at various locations along the elongate portion if, for example, the device is reduced in length (e.g. cut).

In one form, and in at least one orientation of the first end, the first end may be dimensioned so as to pass through the post apertures unhindered. Having the first end dimensioned or sized so that it can pass through the post apertures unhindered can simplify passing of the first end through the apertures, thus requiring less effort to create/secure a bundle of posts. It can also reduce the effort required to remove the device. Even though the first end may be able to pass through the apertures unhindered, in some forms the first end may only be able to be passed through the apertures unhindered in a specific orientation. For example, when the post apertures are not circular, they may have a shape that can allow the first end to pass therethrough in one orientation, but prevent the first end from passing therethrough or being withdrawn therefrom in a different orientation. For example, where the post aperture is an elongate slot, the first end may be sized so that it is slightly smaller than the length of the slot, but larger than the width of the slot. Thus, when the first end is aligned with the long axis of the slot it can pass therethrough unhindered. However, if the first end and/or device is rotated (e.g. by ninety degrees), the first end is no longer aligned with the long axis of the slot. As the first end is larger than the width of the slot, it is prevented from being withdrawn therethrough.

It should be appreciated that a number of different posts exist, including posts of different profiles (such as Y-, T-, C-, H-shaped, hollow section, etc) and different lengths/sizes, as well as posts having different shaped apertures. In this regard, whilst one form of configurable first end may be able to be passed through one type of aperture, it may not necessarily be able to be passed, unhindered or not, through another type of aperture.

In one form, and in at least one orientation of the first end, the first end may be configured such that a portion of the first end deflects to allow the first end to be passed through an aperture. In this regard, in its natural or resting state, the first end may be larger than one or more of the axes of the aperture. However, the end may be able to be deflected to allow the first end to pass through the aperture. Once having been passed through the aperture, the first end can deflect back to its natural or original state, being larger than the aperture, thereby preventing its being withdrawn therefrom. In some forms, the deflected part may be positioned to angle back towards the post once it has been passed through the aperture. Should a withdrawing force be placed on the device, this angling back can assist in the first end preventing its accidental withdrawal therefrom, as the deflected part will engage the post and tend to become even larger, acting as an anchor to prevent its withdrawal.

In one form, the adaptation of the second end may comprise dimensioning of the second end so as to prevent its passing through the apertures. By providing an enlarged second end, for example, there is no concern with the posts being placed on the device accidentally falling off the device as they are being positioned thereon. Further, the second end may be shaped to simplify insertion and/or withdrawal of the device through the apertures. For example, the second end may be shaped to allow the fingers of a user to be placed therein, or to form a small region for holding the device in use, which can help with positioning of the device, etc.

In one form, the device may further comprise a handle portion to facilitate transport of the two or more secured posts. The handle portion may be a separate component which may be attachable to the device, or may be integrally formed with the device. For example, and in one form, the second end or part thereof may be configured to form the handle portion. The handle portion may be formed at the second end, thus allowing the two or more secured posts to be lifted at that second end (i.e. lifted at an edge of one of the posts), or the second end may extend in such a way that the handle portion can extend beyond one of the posts' ends (i.e. at a longitudinal (profiled) end) to allow the bundle to be handled and moved.

In one form, an end of the handle portion may be attachable to the elongate portion of the device. For example, where the handle portion is a separate component, it may be inserted in between adjacent posts so that it can be attached to the device to allow the two or more posts to be removed (e.g. from a larger stack of post bundles).

Where the handle forms part of the second end, an end of the handle portion may be able to be attached to the elongate portion, again by inserting it between adjacent posts, providing a larger area over which the weight of the entire bundle can be distributed.

In another form, an end of the handle portion may be attachable to the first end. In this regard, the handle portion end may be defined by the way in which the first end is configurable such that it cannot be withdrawn through the apertures through which it has already passed.

In one form, a length of the elongate portion may be able to be varied. This can allow a single device to be used for the securement of different numbers of posts. One way in which the length of the elongate portion may be varied, can be through the use of telescoping portions. Alternatively, the elongate portion may be particularly long, thereby allowing the elongate portion to be cut to size, optionally with the first end then being configurable through the use of, for example, a plug to attach to its end.

Also disclosed herein, in a second aspect, is a handle for use in moving a bundle of two or more posts. The handle comprises a gripping portion and at least one attachment portion for attaching to the bundle. This can simplify the movement of bundles of posts from storage, such as when the bundles are collated with like bundles to form large stacks of posts, or when moving the bundle from the back of a vehicle to where the posts are to be employed.

In one form, when the bundle of posts are secured together by a device, the at least one attachment portion and the device may be attachable together. For example, the device and handle may be separate components, or they may take the form of a single component. Where the device and handle are separate components, the attachment portion of the handle may be attachable to the device subsequent to the device being used to form the bundle of posts, or it may be necessary to position the attachment portion of the handle such that the device can be positioned to interact therewith, as the bundle is being formed. Where the device and handle are a single component, the attachment portion may usually be attached at another part of the device to provide sufficient distribution of weight on the handle.

In one form, the attachment portion of the handle may interact with the device to allow the bundle of posts to be moved, such as described above. In an alternative form, and when the posts are of a type that comprise at least one aperture therethrough, the at least one attachment portion may be configured to attach to an aperture of at least one post in the bundle. For example, a bundle of posts may be formed by using a strapping material to strap the posts together. The attachment portion of the handle may be shaped such that it can, for example, hook through an aperture in a post to allow the bundle to be grabbed.

In alternative forms, the attachment portion may comprise two or more portions which are attachable to the device forming the bundle, or to one or more apertures in one or more posts in the bundle. This can allow a more even distribution of weight in the bundle to the handle, and make movement of the bundle easier.

Also disclosed herein, in a third aspect, is a system for securing two or more posts together to form a post bundle. The system comprises two or more posts, each of a type that comprises at least one aperture therethrough. The system also comprises at least one device for securing the two or more posts together. The device may be as defined in the first aspect. Such a system can provide a quicker, safer and improved way to store, transport, and distribute bundles of posts, as well as simplified and faster unpacking of posts from such a bundle.

In one form, the system may further comprise a handle for moving the post bundle. The handle may be as defined in the second aspect. The inclusion of a handle in such a system can allow for a single bundle to be easily removed from a larger stack of bundles of posts. The handle may also be useful for carrying sub-bundles of posts, when in use at a fence line or at a distribution site.

Also disclosed herein, in a fourth aspect, is system for use in moving a bundle of two or more posts. The system comprises a bundle of two or more posts, with the posts being securable together to form the bundle. The system also comprises a handle for attachment to the post bundle. The handle may be as defined in the second aspect. As the handle has an attachment portion that may be attachable either to the bundle, or to at least one of the posts in the bundle, the handle may be employed with bundles formed using current methods, as well as with bundles formed by the device and method as disclosed herein.

In the systems disclosed in the third and fourth aspects, the posts may be of a Y- or T-shaped profile. When such profiled posts are employed, the posts may be arranged in the bundle such that the profiles of adjacent posts are inverted. In this regard, and in one example where a bundle of ten posts are being formed, a series of Y-posts may be aligned by first placing five Y-posts so that their so-called wings are arranged end to end on a surface, such as the ground. Four Y-posts can then be arranged such that their stalks are positioned on the wings of the five adjacent posts, with their wings resting on the stalks of the five adjacent posts. A final post can be positioned on an outer post in a similar manner. It should be appreciated that this is merely an example, and more or less posts may form the bundle. When the apertures in the post are located closer to a stem of the post, such as when a slot is employed as the aperture, i.e. when compared to a traditional post having a round/circular hole, such a bundle arrangement can provide an increased packing density of approximately forty percent, as adjacent posts can have their profile inverted whilst still allowing the slots in adjacent posts to be aligned. This tighter packing density can also minimise the amount of relative movement between the posts.

Also disclosed herein, in a fifth aspect, is method of securing two or more posts together with a device to form a bundle. The posts are each of a type that comprise at least one aperture therethrough. The device is as defined in the first aspect. The method comprises arranging the two or more posts such that apertures in adjacent posts are aligned. The first end of the device is then passed through the aligned post apertures. The first end of the device is configured such that it is prevented from being withdrawn through an aperture through which it has already passed.

In one form, the posts may be positioned so that at least one of their respective ends are aligned with the respective ends of one or more of the other posts. This can simplify storage and transport of the post bundles.

In one form, when the posts are of a Y- or T-shaped profile, the posts may be arranged such that the profiles of adjacent posts are inverted. In this regard, and in one example where a bundle of ten posts is being formed, a series of Y-posts may be aligned by first placing five Y-posts so that their so-called wings are arranged end to end on a surface, such as the ground. Four Y-posts can then be arranged such that their stalks are positioned on the wings of the five adjacent posts, with their wings resting on the stalks of the five adjacent posts, thereby inverting the profiles of adjacent posts. A final post can be positioned on an outer post in a similar manner. When the apertures in the post are located closer to a stem of the post, such as when a slot is employed as the aperture, i.e. when compared to a traditional post having a round/circular hole, such a bundle arrangement can provide an increased packing density of approximately forty percent, as adjacent posts can have their profile inverted whilst still allowing the slots in adjacent posts to be aligned. This tighter packing density can also minimise the amount of relative movement between the posts.

In one form, the first end of the device may be configured such that a portion of the first end deflects to allow the first end to be passed through an aperture. The first end can deflect back, once it has been passed through the aperture. This can prevent the first end from being withdrawn through the aperture.

In one form, when the post apertures are shaped to have an elongate axis (such as a slot), the first end may be configured such that, by altering the orientation of the device, the first end can be prevented from being withdrawn through the aperture. For example, the first end can be aligned with the long axis of the slot when the first end is being passed therethrough. Once all of the posts have been positioned on the device, the first end and/or device can be rotated (e.g. by ninety degrees), so that the first end is no longer aligned with the long axis of the slot thereby preventing it from being withdrawn therethrough.

In another form, the method may further comprise positioning a fastener at the device first end to further prevent the first end from being withdrawn through the aperture. This fastener may be the only form of configuring the first end, or may be used in conjunction with other configuration forms of the first end.

In one form, the method may further comprise attaching a handle to the bundle to facilitate movement thereof. The handle may be attached to at least one aperture of at least one of the posts in the bundle, or may be attached to the device securing the bundle together. In one such embodiment, attaching of the handle to the device may comprise positioning the handle at the bundle of posts prior to the first end of the device being passed through the aligned post apertures. In this regard, the device must be removed from the bundle (and thus the bundle disassembled) prior to the handle being able to be removed therefrom.

The method may otherwise employ the handle disclosed in the second aspect, or implement the systems disclosed in the third or fourth aspects. Further, whilst the method herein described refers only to one such device, more than one such device may be employed to form the bundle of posts. For example, two, three or more such devices may be employed at various points along the length of a post. This may be necessary to ensure the posts are adequately supported along their length, and longer posts may therefore employ more of such devices.

It should also be appreciated that whilst the device, handle, system and method have been described with respect the posts, such as fence posts, other elongate objects may employ the device, handle, system and method disclosed herein.

BRIEF DESCRIPTION OF THE DRAWINGS

Notwithstanding any other forms that may fall within the scope of the device, handle, system and method as set forth in the Summary, specific embodiments will now be described, by way of example only, with reference to the accompanying drawings in which:

FIGS. 1B and 1C show top and end views, respectively, of a first fastener embodiment for use with the first device embodiment shown in FIG. 1A;

FIGS. 7A to 7C show side, top and end views, respectively, of a fifth device embodiment;

FIGS. 9A and 9B show front and end views, respectively, of a second handle embodiment;

FIG. 9C shows a single leg of the second handle embodiment shown in FIGS. 9A and 9B;

FIGS. 13A and 13B show front and end views, respectively, of a fourth handle embodiment.

DETAILED DESCRIPTION

Various embodiments of a device, system and method for securing two or more posts together, as well as a handle and system for moving a bundle of two or more posts, will now be described with reference to FIGS. 1 to 13. Whilst these embodiments will generally be described in relation to fence posts, it should be understood that the device, system, method and handle are not limited to post applications, and may be employed in the securing and moving of other elongate objects.

Figure 1A:
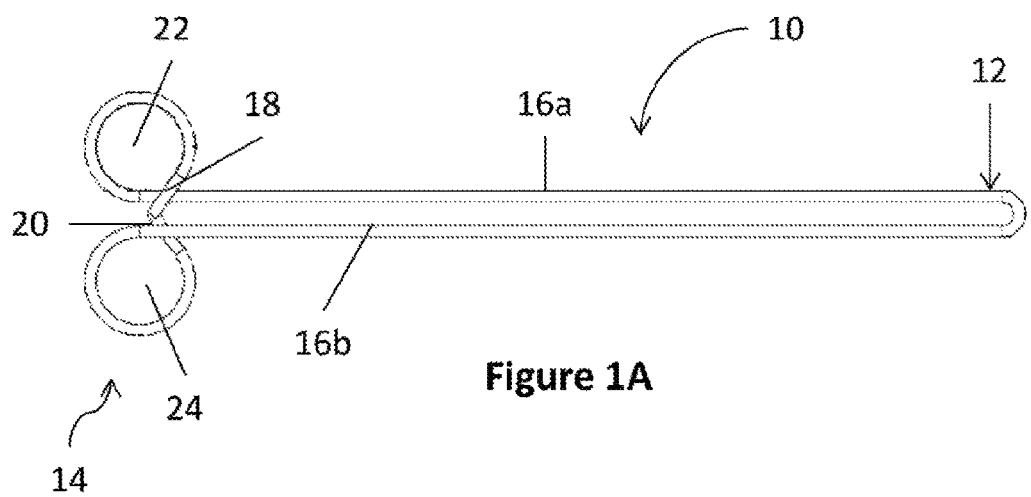
FIG. 1A shows a side view of a first device embodiment.

Referring firstly to FIG. 1A, a first device embodiment, in the form of a spike 10, for securing two or more posts together is shown. The spike 10 has a first end 12, a second end 14, and an elongate portion 16 which forms the length of the spike. The spike 10 is shaped so that the first end 12 and the elongate portion 16 can pass through an aperture in a post. The post aperture may be of any suitable shape including a circular and elongate slot, such as an obround. It should be appreciated that spike 10 may be formed to any length, by the length of the elongate portion being appropriately adjusted.

In this embodiment, the spike 10 is formed from a single piece of material, with the two ends 18, 20 of the material forming part of the second end 14. A suitable material may, for example, be a 'range 2' spring steel although other materials would also be suitable. End 18 of the material forms a first loop 22, with the material extending to form the elongate portion 16a and the first end 12. The material then doubles back on itself to form the first end 12 as U-shaped, and extends substantially parallel with the elongate portion 16a, and forms the elongate portion 16b, terminating at end 20 as a second loop 24. The two loops 22, 24 may allow a user to easily hold the spike 10 (e.g. by inserting a finger through each loop) for insertion through and removal from the apertures. The two loops 22, 24 (i.e. the second end 14) are sized such that the loops 22, 24 are unable to pass through an aperture in a post. However, the distance between elongate portions 16a and 16b (and thus the maximum width of the U-shaped first end 12 and the elongate portion 16, generally) is less than the maximum width or length of the aperture through which it is to be passed. This allows the first end 12 and elongate portion 16 to be passed through aligned apertures in adjacent posts unhindered.

Figure 2:
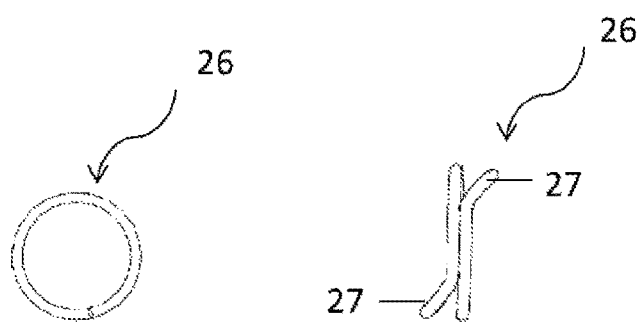
FIG. 2 shows a side view of a second fastener embodiment for use with the first device embodiment shown in FIG. 1A.
Figure 2:
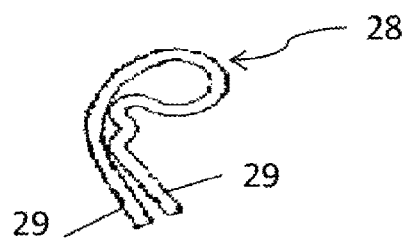

In order to configure the U-shaped first end 12, a fastener, such as the split ring 26 shown in FIG. 1B or the R-clip 28 shown in FIG. 2, can interact therewith to prevent the first end 12 from being withdrawn through an aperture. Such fasteners 26, 28 when, positioned at the first end 12, actively prevent the first end 12 from being withdrawn through an aperture through which it has already passed. However, the fasteners 26, 28 can also be removed from the first end 12, which allows the spike 10 to be removed from the apertures, allowing one or more posts to be separated from the remaining posts on the spike 10.

Figure 3A:
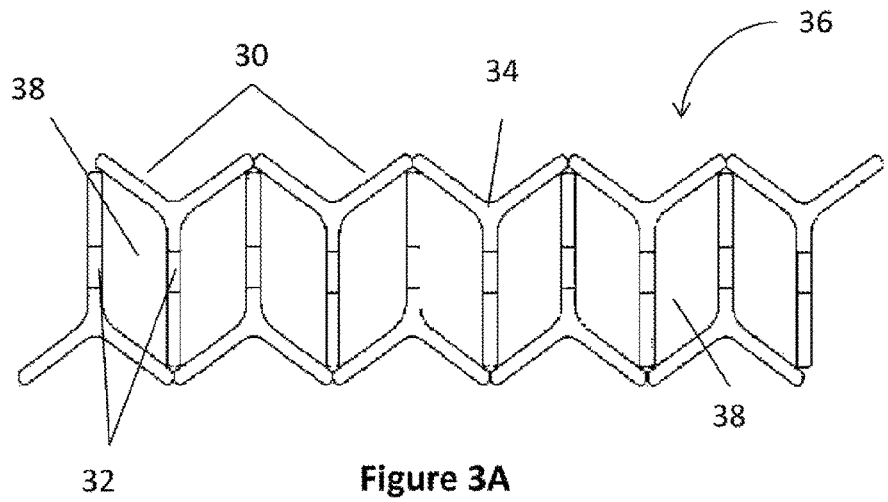
FIG. 3A shows an end view of a layer of posts arranged for securement together.
Figure 3B:
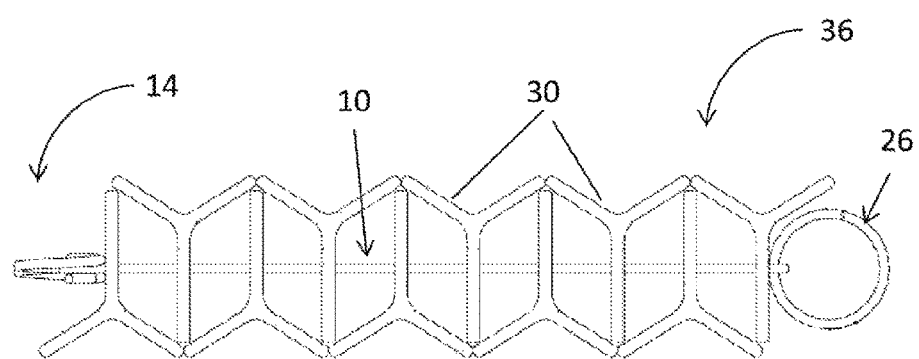
FIG. 3B shows an end view of a layer of posts secured together using the first device embodiment shown in FIG. 1A and the first fastener embodiment shown in FIGS. 1B and 1C.
Figure 3C:
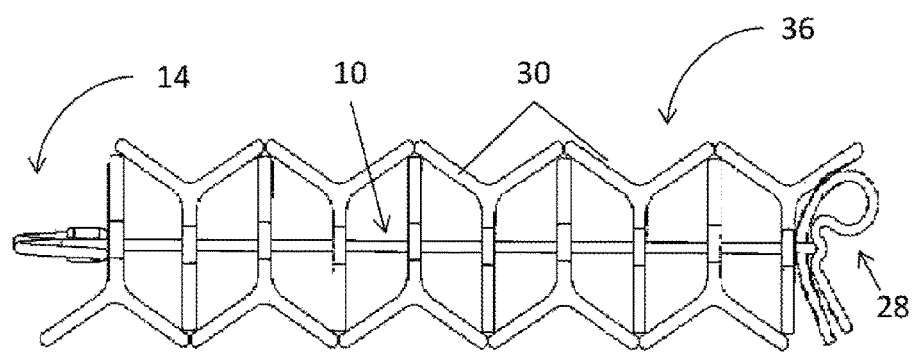
FIG. 3C shows an end view of a layer of posts secured together using the first device embodiment shown in FIG. 1A and the second fastener embodiment shown in FIG. 2.

In this regard, and with reference to FIGS. 3A to 3C, a number of Y-posts 30 are shown arranged such that at least one aperture 32 therein is aligned with an aperture in an adjacent post. Although ten Y-posts 30 are shown, fewer or more than ten posts, or posts having a different profile, may be used. Additionally, whilst FIGS. 3A to 3C show the profile of adjacent Y-posts as having alternating inverted profiles, adjacent posts need not be so arranged. For example, the arrangement of the Y-posts in FIGS. 3A to 3C may not be possible with some configurations of the apertures in the posts (such as round or circular holes which cannot be positioned as closely to a stem 34 of the post) and, whilst not clearly shown, the apertures 32 are in the shape of an elongate slot. This, and other shaping and positioning of the holes/slots in the stalk of the post, assist in the alignment of the slots/holes which can provide an improved packing density of the posts.

FIG. 3A shows the ten Y-posts 30 arranged prior to being secured together. FIGS. 3B and 3C show two embodiments of spike 10 being used to secure the posts 30 together, with FIG. 3B showing the use of a split-ring type fastener 26 and FIG. 3C showing the use of an R-clip type fastener 28 to lock the spike 10 and thus prevent the first end 12 thereof from unintentionally being withdrawn through the apertures 32. Other types of removable fasteners may also be employed, although are not shown, such as split pins, staples, ties, etc.

Split ring 26, as shown in FIGS. 1B and 1C, can be threaded onto the first end 12 of spike 10 by separating or forcing one of its ends 27 away from the main body of the split ring 26. Once the spike has been passed through an aperture 32 of each of the posts to be secured together, the split ring 26 acts as an anchor point against a flange of the end post 30 and prevents the first end 12 from being withdrawn through the aperture 32. R-clip 28, as shown in FIG. 2, functions in a similar manner with the ends 29 of the R-clip 28 being separated, such as by pushing down onto the first end 12 of the spike 10, to secure it thereto.

In some embodiments, where it may be desirable to remove a single post from the spike at a time, the length of the elongate portion of the spike may be variable. For example, the elongate portion may be formed in two parts to allow telescoping of the parts. This would ensure that remaining posts on the spike were able to be adequately secured to prevent posts separating along the spike. Alternatively, an alternate fastener, such as a plug, may be employed, so that the elongate portion can be cut to length, as required, and the plug attached the resulting first end (i.e. that end part of the elongate portion which had been cut) to thereby prevent the first end from being withdrawn through an aperture through which it has already passed.

Figure 4A:
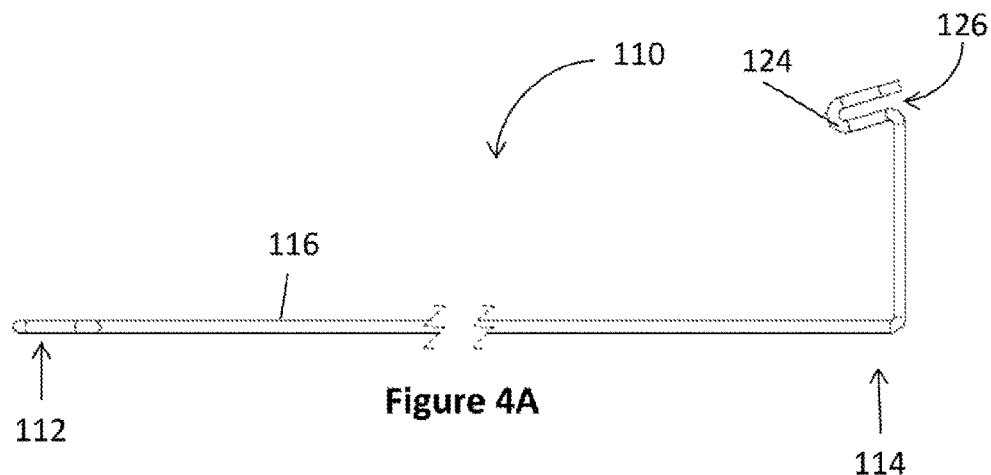
FIGS. 4A to 4C show side, top and end views, respectively, of a second device embodiment.
Figure 4B:
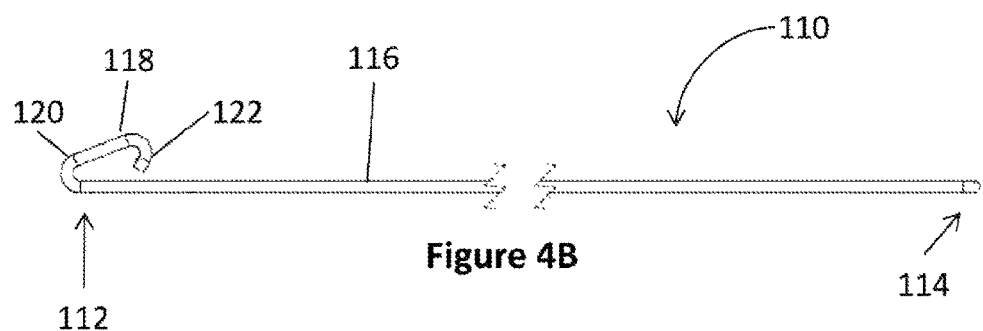
Figure 4C:
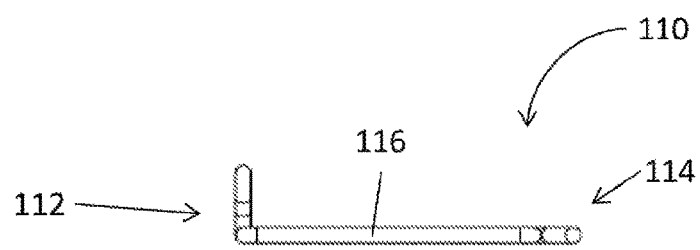

A second device embodiment, in the form of spike 110 is shown in FIGS. 4A to 4C. The spike 110, similar to spike 10, also has a first end 112, a second end 114 and an elongate portion 116. The elongate portion 116 is shown using broken lines, to indicate that it may be of any suitable length. The length of elongate portion 116 may be tailored for a specific use (e.g. a specific length to use with four posts, or a specific length to use with ten posts, or a specific length to use with a different number of posts), or it may be formed to be of a variable length, such as by telescoping parts.

In this embodiment, first end 112 is configured such that it has a hooked leg portion 118 that can deflect as it passes through an aperture. The leg portion 118 is angled such that its end 120 engages an edge of the aperture, thereby forcing the leg portion 118 to deflect to pass through the aperture. Once the first end has passed through the aperture, the leg portion 118 deflects back to its original configuration (i.e. so that the first end 112 is larger than the aperture), thereby preventing it from being withdrawn through the aperture. In this regard, the hooked leg portion 118 is generally angled so that if the spike 110 is bumped or attempted to be withdrawn, the hooked leg portion 118 will abut against a flange of the outermost post and act as an anchor to further prevent its withdrawal therefrom. Foot 122 of the hooked leg portion 118 can also assist in this regard. In such an embodiment, it may be necessary to remove (e.g. cut) end 112 to allow access to the posts in the bundle, and this embodiment may be considered to be non-reusable. Although, it should be appreciated that a fastener, such as a plug, may be employed to attach to the resulting first end to allow spike 110 to be re-used with, for example, a subset of the post bundle, or in a different bundle of posts.

In addition to this, where the post comprises an elongate slot, such as an obround, it is also possible that the first end 112 can be aligned with the long axis of the slot so that the first end can be passed therethrough. Once the spike 110 has been passed through all of the required posts, the entire spike 110 can be rotated ninety degrees, so that the first end 112 is no longer aligned with the elongate axis of the slot. In some embodiments, such as where the spike is formed as a two piece device, it may only be necessary to rotate that part of the spike which includes the first end. This can provide an additional or alternate form of configuring the first end 112 such that it is prevented from being withdrawn through the apertures through which it has already been passed. In such an embodiment, spike 110 may be considered to be reusable, assuming first end 112 passes through the slot unhindered (i.e. end 112 is smaller than the length of the slot), or non-reusable, assuming the leg portion 118 of the first end 112 is required to deflect to pass through the slot (i.e. end 112 is larger than the length of the slot).

The second end 114 is clearly shown as being configured to be larger than an aperture through which the first end 112 could be passed. The second end 114 extends in a plane perpendicular to that of the first end 112. The second end 114 is also shown having a rounded end 124, which may be otherwise similarly dimensioned to end 120 of the first end 112. In embodiments where the entire spike 110 is rotated ninety degrees so that the first end 112 is misaligned with the axis of the aperture, on rotating the spike 110, end 124 may be positioned away from the elongate portion 116 so that it engages in an adjacent aperture on the post. In other forms, for example where it is not necessary to rotate the spike 110 (e.g. where the first end 112 deflects passed the aperture) the end 124 may be positioned away from the elongate portion 116 so that it locks behind a wing of the post with the end 124 being shaped to facilitate its riding past the wing. Further, the channel 126 formed in the end 124 may be employed to improve the stacking of adjacent bundles of posts. In both of these embodiments, end 124 may act as an additional securing mechanism for the device.

Figure 5A:
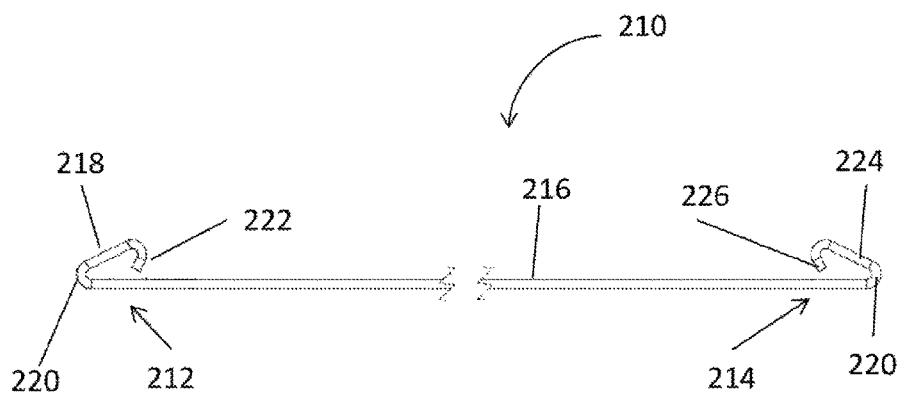
FIGS. 5A to 5C show side, top and end views, respectively, of a third device embodiment.
Figure 5B:
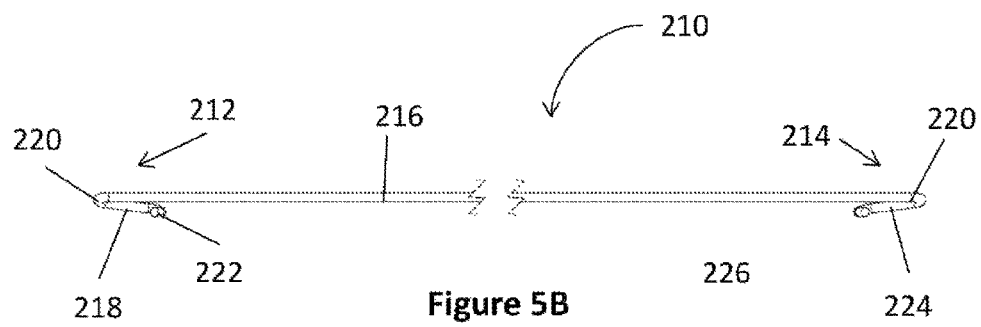
Figure 5C:
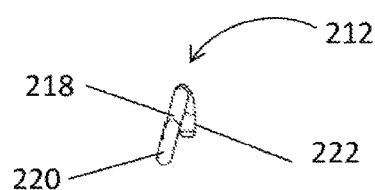

Referring now to FIGS. 5A to 5C, a third device embodiment, in the form of spike 210, is shown. Spike 200, similar to spikes 10 and 110, also has a first end 212, a second end 214 and an elongate portion 216 extending therebetween. The elongate portion 216 is also shown using broken lines, similar to the spike 100 shown in FIG. 3, to indicate that it may be of any suitable length. Alternatively, the spike 210 may also be formed in two parts to allow its length to be altered, such as by telescoping the two parts. Both the first and second ends 212, 214 are similar to the second embodiment first end 112. Despite the first and second ends 212, 214 being of a similar configuration, due to the way in which the spike 210 is inserted through the apertures, second end 214 will inherently be prevented from passing therethrough. In this regard, the first end 212 is configured such that it has a hooked leg portion 218 that can deflect as it passes through an aperture. The leg portion 218 is angled such that its end 220 engages an edge of the aperture, thereby forcing the leg portion 218 to deflect to pass through the aperture. Once the first end 212 has passed through the aperture, the leg portion 218 deflects back to its original configuration (i.e. so that the first end 212 is larger than the aperture), thereby preventing it from being withdrawn through the aperture. In a manner similar to the first end 112 of spike 110, the hooked leg portion 218 is generally angled so that if the spike 210 is bumped or attempted to be withdrawn, the hooked leg portion 218 will abut against the post and act as an anchor to further prevent its withdrawal therefrom. Foot 222 of the hooked leg portion 218 can also assist in this regard.

As the spike 210 is passed through the apertures of the posts, second end 214 acts in a similar, but reversed, manner to the first end 212. In this regard, the second end 214 also comprises a hooked leg portion 224 that is naturally wider than the apertures in the post. The foot 226 of the leg portion 224 will abut against the post and prevent the second end 214 from passing through the aperture.

In some alternate embodiments, the spike 210 may also be rotated so that the first and second ends are, for example, misaligned with the apertures in the post to prevent the withdrawal therethrough, in the case of the first end, and to prevent the passing therethrough, in the case of the second end. In other alternate embodiments, the second end may be larger than the first end, thereby preventing the second end from passing through the apertures but allowing the first end to pass through the apertures in a first orientation. The device or first end may then be rotated to misalign the first end with the post apertures to prevent the withdrawal therethrough.

Figure 6A:
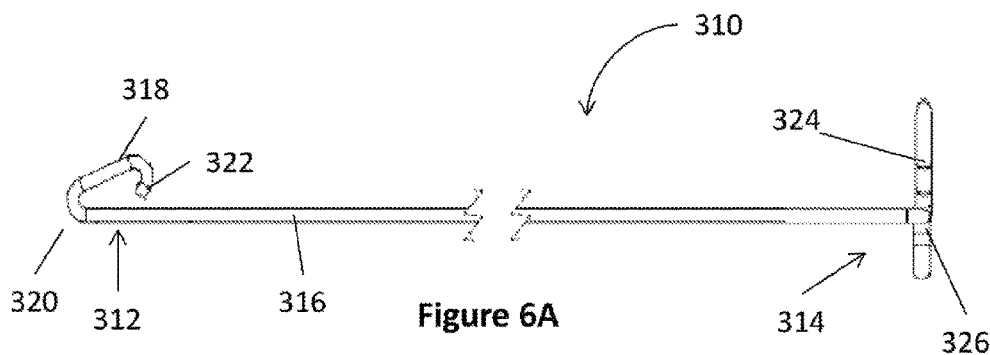
FIGS. 6A to 6C show side, top and end views, respectively, of a fourth device embodiment.
Figure 6B:
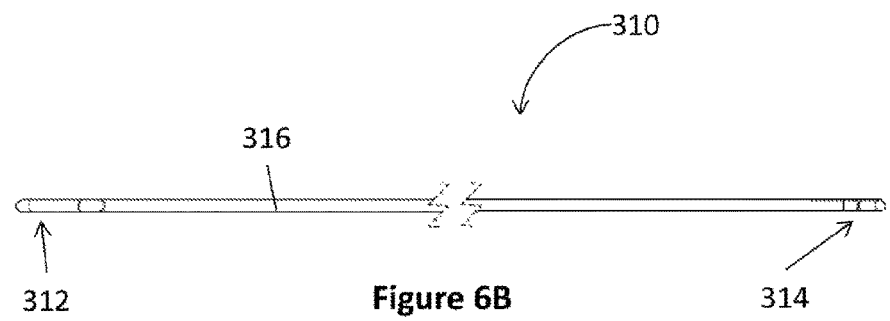
Figure 6C:
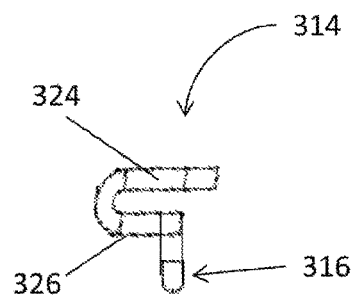

With reference now to FIGS. 6A to 6C, a fourth device embodiment, in the form of spike 310, is shown. Similar to the previous embodiments, the spike 310 also comprises a first end 312, a second end 314 and an elongate portion 316 extending between the ends 312, 314. The first end 312 is again similar to the first ends 112, 212 of spikes 110 and 210, and so will not be described in further detail, except that the same numbering shall be adhered to, with the preceding numeral of like features being replaced with the numeral '3' (e.g. hooked leg portion 118, 218 will become 318, and so on).

The second end 314 of spike 300 acts as a simple anchor to prevent its passing through apertures in the posts. Thus, a simple truncated U-shaped configuration, having the two legs 324 and 326, such as shown in FIG. 6C, can extend from the elongate portion 316. Second end 314 can act as an anchor regardless of the orientation of the spike 310. For example, if the spike 310 is rotated ninety degrees once the first end 312 has been passed through the apertures, second end 314 will also rotate, and simply sit in a different orientation as the anchor.

A fifth device embodiment, in the form of a spike 410 is shown in FIGS. 7A to 7C. The spike 410 is similar to the spike 10 shown in FIG. 1, and like features will not be described in further detail, except that the same numbering on the figures shall be adhered to, except with a preceding numeral '4' being added to the numbering of like features (e.g. first end 12 will become 412, and so on).

The second end 414 of spike 410 has a similarly shaped first looped part 422, however the second looped part 24 of spike 10 is not present. Instead, this portion of material has been adapted to form a handle portion 440, and a combined attachment portion and fastener in the form of latch 442. A first arm 444 spaces the handle portion 440 from the elongate portion 416, and a second arm 446, of a similar length to the first arm, spaces the latch 442 from the handle portion 440. In this regard, the second arm 446 can act as a lever to allow the latch 442 to be hooked into the first end 412. In this regard, latch 442 acts as both an attachment point to the spike 410 of the handle portion 440, as well as a fastener of the first end 412 (i.e. to prevent the first end from being withdrawn through an aperture through which it has already been passed). Although, in other forms, the latch may have a different configuration and attach to a point along the elongate portion, and a separate fastener, such as the split ring 26 and R-clip 28 shown in FIGS. 1B and 2, may be employed to configure the first end such that it is prevented from being withdrawn through an aperture through which it has already been passed.

Figures 8A, 8B:
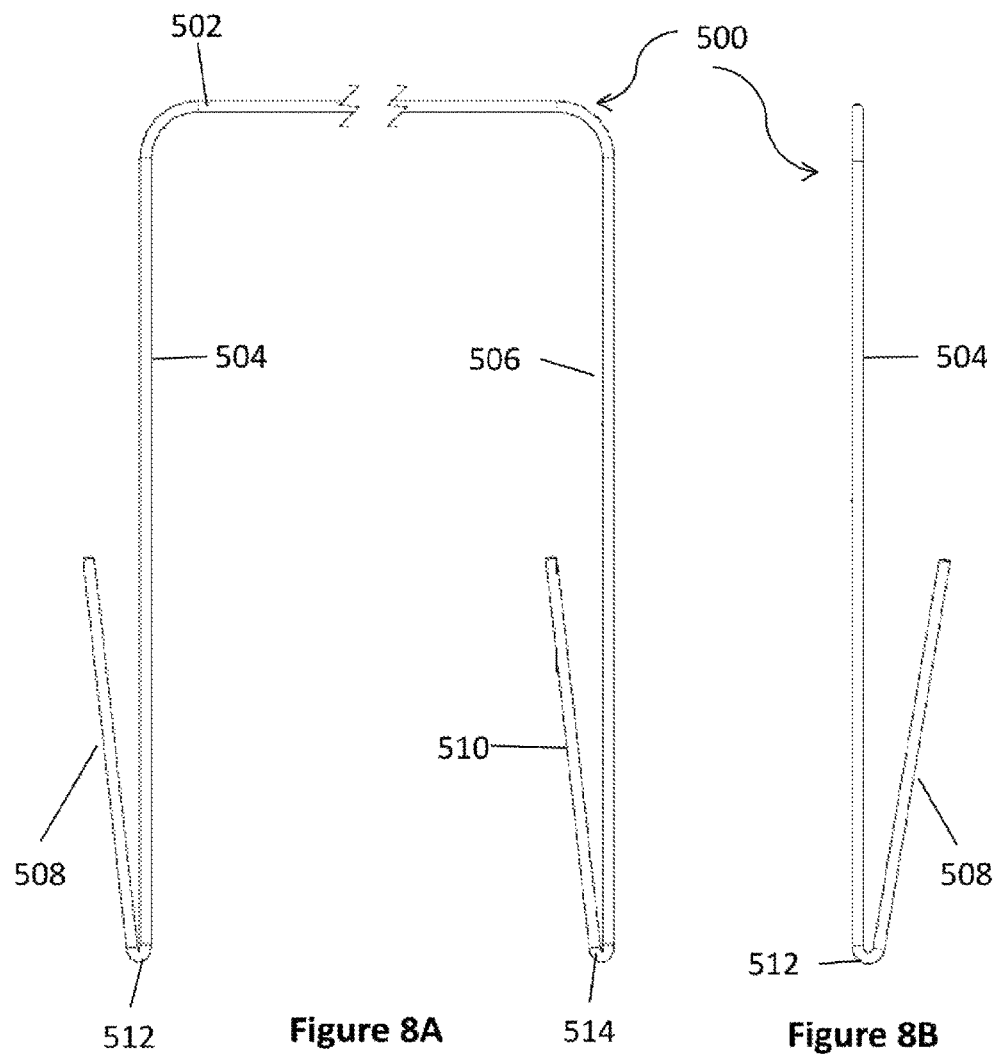
FIGS. 8A to 8C show front, end and top views, respectively, of a first handle embodiment.
Figure 8C:
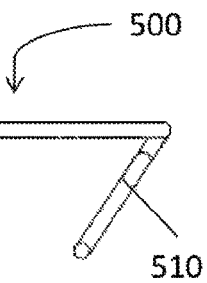

Reference is now made to FIGS. 8A to 8C, where various views of a first embodiment of a handle 500, for moving a bundle of two or more posts, are shown. The handle 500 comprises a gripping portion 502, which can be gripped by a user of the handle. The handle 500 also comprises two attachment portions in the form of legs 504 and 506. Each leg 504, 506 has a foot 508, 510 extending therefrom, which can be used to engage a device, such as the various spike embodiments shown in FIGS. 1 to 6, which secures the bundle of posts together. The device may otherwise be a known device, such as thin ductile wire ties, or a strapping material which surrounds the bundled posts. Whilst the legs 504, 506 and feet 508, 510 are shown as being positioned in the same manner (i.e. feet 508 and 510 extend in the same general direction from legs 504 and 506) one or other of the legs/feet may be oriented differently to accommodate a specific device employed to secure the bundle of posts together. For example, ankle joint 514 and foot 510 may extend from leg 506 in the opposite direction to which ankle joint 512 extends and foot 508 extend from leg 504. Such an offset nature can provide additional bias, which may further assist in the attachment of the legs to a device. In alternate examples and embodiments, only one such leg may extend from the handle portion. In such an alternate embodiment, it may be preferred that the leg is more centrally positioned with respect to the handle portion to ensure that the weight of the posts is relatively evenly distributed to the handle portion.

For ease of reference, the handle 500 will be described with reference to the bundle of posts 36, as shown in FIGS. 3A to 3C, and thus the spike 10 will also be referred to. The feet 508, 510 and legs 504, 506 of the handle 500 can be inserted into the space/cavity 38 formed between adjacent posts 30, such as between the first and second posts, and the ninth and tenth posts.

The ankle joints 512, 514 between the feet 508, 510 and legs 504, 506 allow the feet 508, 510 to be deflected past the elongate portion 16 of spike 10 as they are being inserted into the cavities 38. Once the feet 508, 510 have fully passed the spike 10, they deflect back to their original position. The handle 500 can then be pulled back toward the user, thereby engaging the ankle joints 512, 514 with the elongate portion 16 of the spike 10, thus attaching the handle 500 to the bundle 36, via spike 10. The bundle 36 can then be moved, such as by dragging, to simplify movement or relocation of the bundle from a larger stack of post bundles. In this regard, it may also be possible to move or relocate two or more bundles from a larger stack. For example, by attaching the handle to a bundle which is not located at the top of the stack of post bundles, it may be possible to move the bundles that are located above the bundle to which the handle is attached. For example, if there are one or two bundle layers above the bundle to which the handle is attached, those bundles may also be moved.

It should also be appreciated that the handle 500 need not be inserted into the cavities 38 only after the spike 10 has been inserted through the post apertures to secure the bundle together. For example, the handle may be inserted into the cavities prior to the spike being inserted through the aligned apertures of the posts, thus eliminating the need for the feet 508, 510 to deflect past the spike.

The gripping portion 502 is shown using broken lines, to indicate that it may be of any suitable length. The length of the gripping portion 502 may be tailored for a specific use (e.g. a specific length to use with four posts, or a specific length to use with ten posts, or a specific length to use with a different number of posts), or it may be formed to be of a variable length, such as by telescoping parts, which would allow a single handle 500 to be employed in many different applications.

A second embodiment of a handle 600, for moving a bundle of two or more posts, is shown in FIGS. 9A to 9C. The handle 600 comprises a gripping portion 602, again shown using broken lines to indicate that it may be of any suitable length, which can be used by a transporter of the post bundles to hold onto and facilitate movement thereof. The handle 600 is somewhat similar to handle 500, except that each leg 604, 606 is formed by a pair of sub-legs 604a, 604b and 606a, 606b, respectively. In this regard, each sub-leg 604a, 604b, 606a, 606b has its own ankle joint 612a, 612b, 614a, 614b and its own foot 608a, 608b, 610a, 610b. An exemplary leg 604 is shown in FIG. 9B and an exemplary sub-leg 604a is shown in FIG. 9C.

As can be seen in FIG. 9B, the two sub-legs 604a, 604b, which form leg 604, are attached at 620. The sub-legs 604a, 604b may be welded, or crimped, etc. together. In the embodiment shown, the sub-legs 604a, 604b extend downwardly from the crimped portion 620, and are angled slightly way from each other. The ankles 612a, 612b and feet 608a, 608b are positioned and angled from the sub-legs 604a, 604b such that the ends of feet 608a, 608b cross-over slightly. In this regard, foot 608a points towards sub-leg 604b, and foot 608b points towards sub-leg 604a. Leg 606 is similarly formed to leg 604 and, as such, the description thereof will not be repeated to reduce duplication.

For ease of reference, handle 600 will be described as being attached to a spike S. Such a spike may include one of the spikes as disclosed herein. Although, it should be appreciated that the handle 600 may be attachable to another part of the bundle, such as a surrounding packing strap, or another form of known securing means, such as thin ductile wire ties. In one form, the legs 604, 606 of handle 600 can be attached to spike S by inserting the respective legs into cavities 38 formed between adjacent posts in the bundle. In this regard, the bundle of posts has already been formed and secured by the passing of spike S through aligned apertures of the posts. Whilst only the attachment of leg 604 to spike S will be described in detail, it should be appreciated that the attachment of leg 606 to spike S will be similar thereto and will generally occur simultaneously with leg 604.

As leg 604 is inserted into cavity 38, the feet 608a and 608b will come into contact with spike S. As the leg 604 is pushed further into the cavity, feet 608a and 608b will deflect slightly. Once the spike S has pushed past the feet 608a, 608b, the feet then deflect back to their original position, thus confining spike S within the recess 616 formed between the sub-legs 604a, 604b and feet 608a, 608b of leg 604. This arrangement is best shown in FIG. 9B. When the handle 600 is to be used to move the bundle of posts, the gripping portion 602 is pulled away from the post bundle (i.e. instead of the legs 604, 606 being inserted/pushed into the cavity, they are attempted to be extracted from the cavity). In doing so, the spike S engages with the feet 608a, 608b and increases the amount of cross-over therebetween. This prevents the leg 604 from becoming accidentally dislodged from the spike S and increases the weight distribution of the post bundle over the entire handle.

To remove handle 600 from the bundle 36, it will usually be necessary to remove the spike S, or a specialised tool may be used to separate the feet 608a, 608b (i.e. so that foot 608a is deflected closer to sub-leg 604a, and foot 608b is deflected closer to sub-leg 604b, thus forming a gap between the feet 608a, 608b and allowing the spike S to pass therethrough).

Figure 10A:
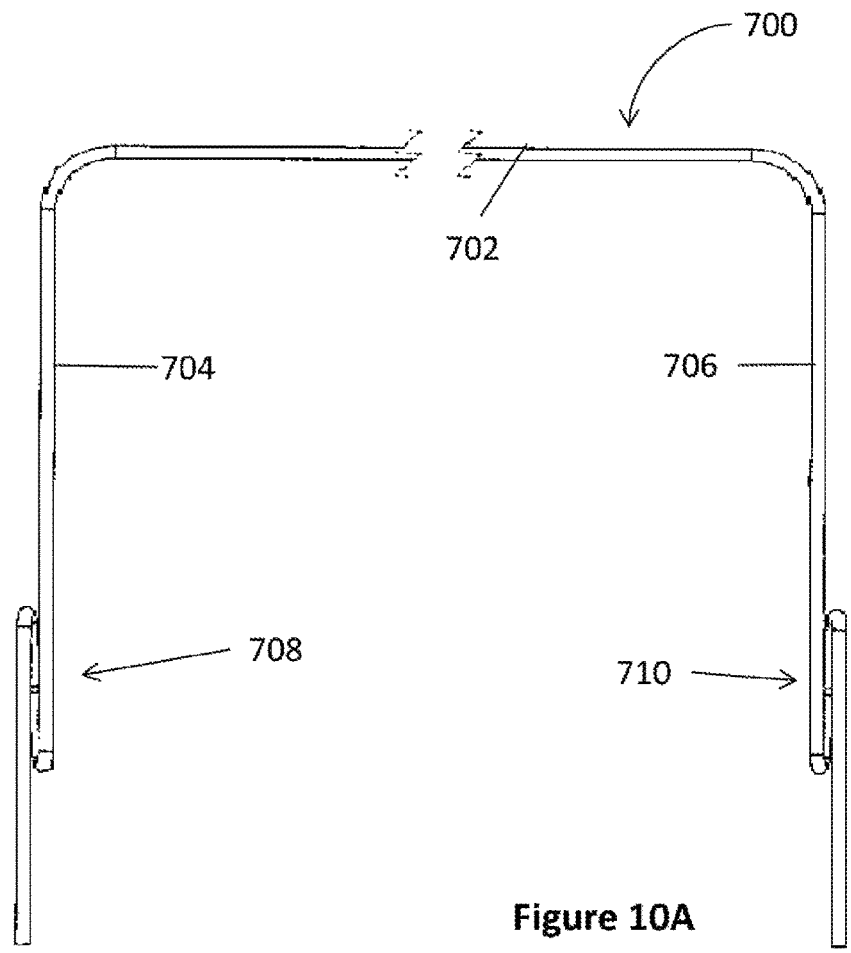
FIGS. 10A and 10B show front and end views, respectively, of a third handle embodiment.
Figure 10B:
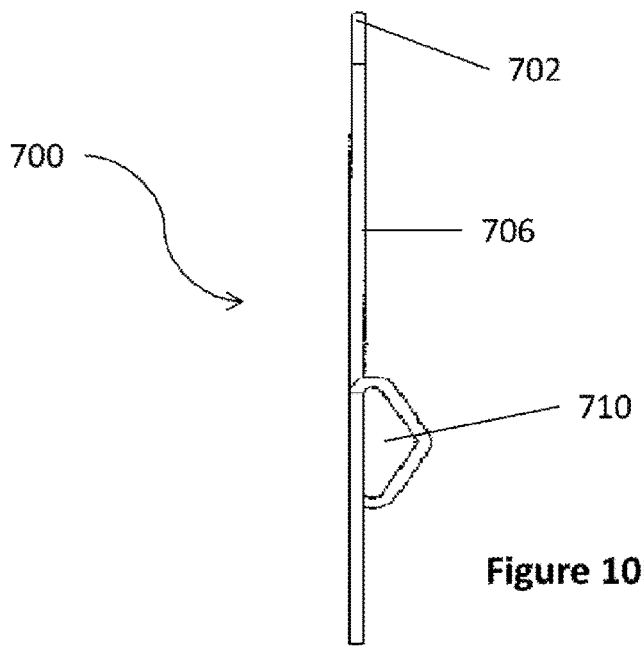

A third embodiment of a handle 700 is shown in FIGS. 10A to 10C. In this embodiment, the handle 700 comprises a gripping portion 702, again shown using broken lines to indicate that it may be of any suitable length, which can be used by a transporter of the post bundles to hold onto and facilitate movement thereof. Again, handle 700 is shown having two legs 704, 706. Each leg 704, 706 has a closed loop 708, 710 which has been formed therein. In this regard, it is necessary to position the legs 704, 706 within the post bundle so that a spike S, or other device for forming the bundle, can be passed through the closed loops 708, 710. In this regard, the loops 708, 710 must be aligned with the apertures through which the spike S or other device is being passed. Again, to remove the handle 700 from the bundle, the spike S must first be removed.

Figure 11A:
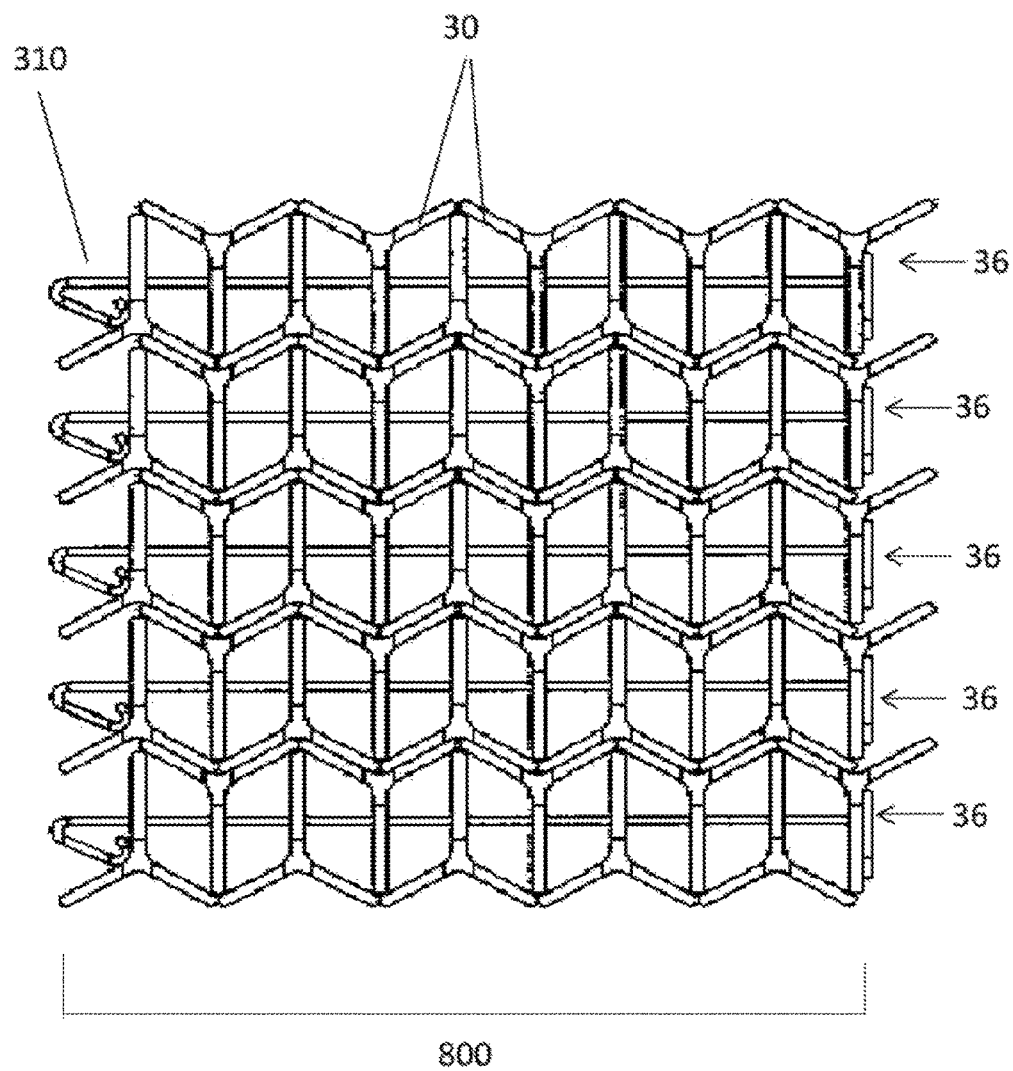
FIG. 11A shows an end view of five stacked layers of secured posts, with each layer of posts secured together using the fourth device embodiment shown in FIGS. 6A to 6C.
Figure 11B:
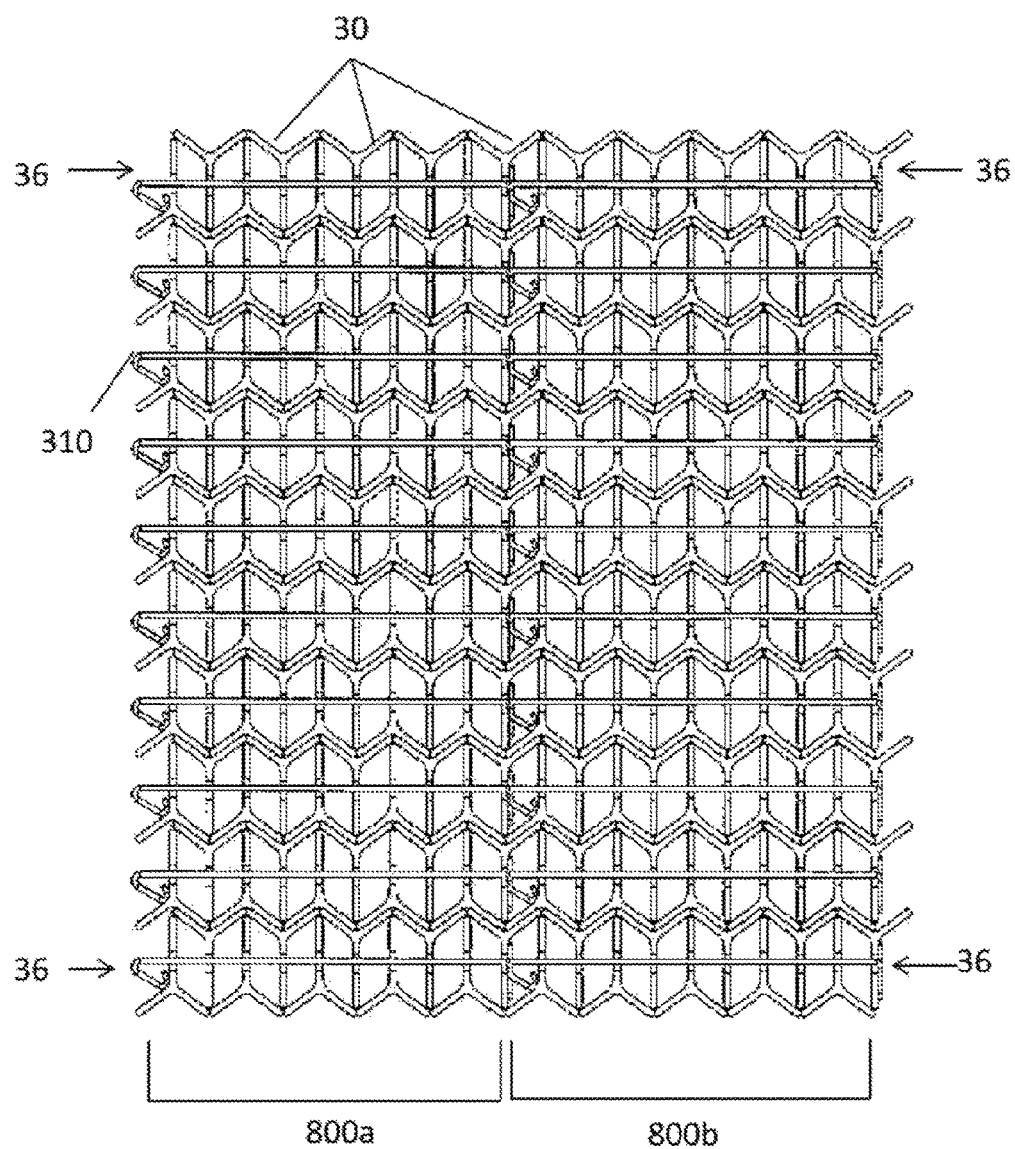
FIG. 11B shows an end view of two adjacent stacks of secured posts, each stack containing ten layers of secured posts, with each layer of posts secured together using the fourth device embodiment shown in FIGS. 6A to 6C.

Referring now to FIGS. 11A and 11B, larger stacks 800 of post bundles 36 are shown. FIG. 11A shows a stack 800, formed by five post bundles 36. Each bundle 36 contains ten posts 30 which have been secured together by spike 310. Each bundle 36 can be removed from the stack 800 by attaching a handle (such as those described in FIGS. 8 and 9, above) to the spike 310. Such a stack 800, which is relatively small, may be those posts kept in storage by, for example, a farmer. One such bundle 36 can then be readily separated from the stack 800 and moved or transported to the location at which the posts are to be used.

FIG. 11B shows a much larger stack of post bundles. In this regard, two such stacks 800a, 800b are positioned side-by-side. Each stack 800a, 800b is formed by ten post bundles 36, with each post bundle 36 containing ten posts 30 which have been secured together by spike 310. Such stacks 800a, 800b may be more characteristic of the post storage requirements for a post distributor.

Figure 12A:
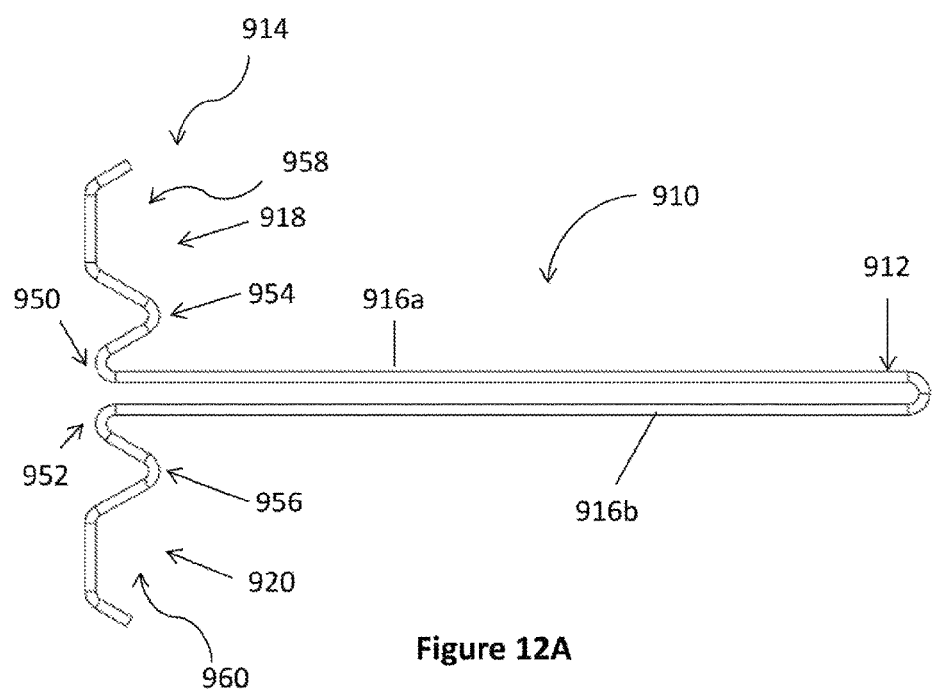
FIG. 12A shows a side view of a sixth device embodiment.
Figure 12B:
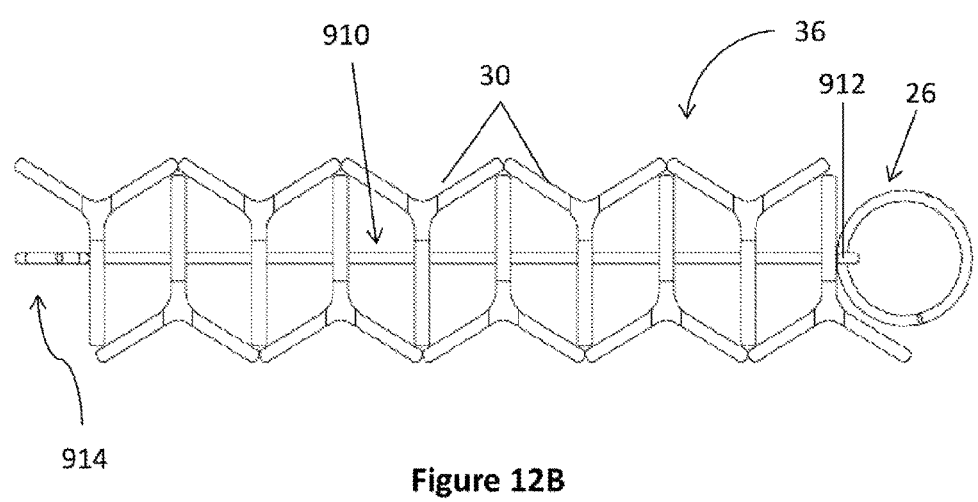
FIG. 12B shows an end view of a layer of posts secured together using the sixth device embodiment shown in FIG. 12A and the first fastener embodiment shown in FIGS. 1B and 1C.

A sixth device embodiment, in the form of a spike 910 is shown in FIG. 12A and, in use, in FIG. 12B. The spike 910 is similar to the spike 10 shown in FIG. 1, and like features will not be described in further detail, except that the same numbering on the figures shall be adhered to, with a preceding numeral '9' being added to the numbering of like features (e.g. first end 12 will become 912, and so on).

The second end 914 of spike 910 has a different configuration to the second end 14 of spike 10 that, nonetheless, prevents the second end 914 from passing through an aperture in a post. Ends 918, 920, which together form the second end 914 in this embodiment, each have a first bend 950, 952 therein that bends the end 918, 920 back towards elongate portions 916a, 916b in use. The ends 918, 920 then extend to a second bend 954, 956, which sits adjacent to a flange of a post in use and acts as an obstruction to further insertion of the spike through the apertures. A C-shaped terminal end 958, 960 extends from the second bend 954, 956 and is spaced from the elongate portions 916a, 916b in use. The C-shaped terminal ends 958, 960 each form a recess to allow a finger of a user to be placed therein to facilitate removal of the spike 910 from the bundle of posts. It should be appreciated that only one such end 918, 920 may be required to form the second end 914.

The configuration of ends 918, 920 can also be altered slightly to allow the spike 910 to be employed with post bundles of different sizes (whether that be a different number of posts in the bundle, or a bundle of posts larger in size/profile). For a bundle of posts that have a larger profile than those shown in FIG. 12B, for example, the elongate portions 916a, 916b of the spike 910 that are employed to secure the posts together may need to be longer than the spike 910 shown in FIGS. 12A and 12B. An apparent lengthening of the elongate portions 916a, 916b may be achieved by increasing the interior angle of first bend 950, 952, which then makes more of the elongate portions 916a, 916b available for extension through apertures (i.e. increasing the interior angle of the first bend 950, 952 causes repositioning of the second bend 954, 956 to be more closely aligned with the first bend 950, 952, such that the second bend 954, 956 no longer forms an obstruction to further insertion of the elongate portions 916a, 916b of the spike through the apertures). Abutting the second bend 954, 956 against a flange of the post (e.g. during insertion of the spike 910), may force the interior angle of first bend 950, 952 to be increased, although it should be appreciated that increasing the interior angle of first bend 950, 952 may be achieved in other ways, such as by hand.

As shown in FIG. 12B, the profile of the second end 914 is such that it does not extend (protrude) beyond the wing of the outer post. This can assist in improving the packing density of adjacent bundles of posts.

In a similar manner to that described in FIG. 3B, a split ring 26 interacts with, and thereby configures, the U-shaped first end 912 to prevent the first end 912 from being withdrawn through an aperture. The split ring 26 acts as an anchor point against a flange of the end post 30 and prevents the first end 912 from being withdrawn through the aperture. R-clip 28, as shown in FIG. 2, functions in a similar manner with the ends 29 of the R-clip A fourth embodiment of a handle 1000 is shown in FIGS. 13A and 13B. Handle 1000 is similar to handle 500 shown in FIG. 8. In this embodiment, the handle 1000 comprises a gripping portion 1002, again shown using broken lines to indicate that it may be of any suitable length, which can be used by a transporter of the post bundles to hold onto and facilitate movement thereof. For ease of reference, handle 1000 will be described with reference to the bundle of posts 36, as shown in FIGS. 3A to 3C, and thus spike 10 will also be referred to. Again, handle 1000 is shown having two legs 1004, 1006. Handle 1000 is similar to handle 500 in that each leg 1004, 1006 has a foot 1008, 1010 extending therefrom at ankle joints 1012, 1014. A further joint 1020, 1022 is provided at the end of each foot 1008, 1010, from which a latch 1016, 1018 extends back towards ankle joint 1012, 1014 and legs 1004, 1006. Ankle joints 1012, 1014 between the feet 1008, 1010 and legs 1004, 1006 allow the feet 1008, 1010 to be deflected past spike 10 as the legs 1004, 1006 are inserted into the space/cavity 38 formed between adjacent posts.

Once joints 1020, 1022 have fully passed spike 10, feet 1008, 1010 deflect back to their original position. Thus, when handle 1000 is pulled back toward the user, latches 1016, 1018 are deflected as they are pulled past spike 10. Latches 1016, 1018 are shown as being shorter than feet 1008, 1010, which allows sufficient space for spike 10 to move past ends 1024, 1026 before reaching ankle joints 1012, 1014.

Once spike 10 has fully moved past ends 1024, 1026, latches 1016, 1018 deflect back to their original position. This essentially traps, or confines, spike 10 within the void 1028 formed between legs 1004, 1006, feet 1008, 1010 and latches 1016, 1018, and locks the handle in position. Once locked in this position, handle 1000 can again be pushed into the space/cavity 38 until spike 10 is wedged between feet 1008, 1010 and latches 1016, 1018. This will generally result in the gripping portion 1002 being located adjacent to the ends of the posts in the bundle, to minimise the extent to which the handle protrudes from the bundle. This can further assist in improving the packing efficiency of the post bundles, for example, during transport. When the post bundle is to be moved, a user can simply pull on the gripping portion 1002 of the handle 1000 so that spike 10 engages with ankle joints 1012, 1014, allowing the bundle to be moved, such as by dragging.

Again, to remove the handle 1000 from the bundle, the spike 10 may need to be removed first, or the feet 1008, 1010 and/or latches 1016, 1018 may need to be removed (e.g. by cutting, thereby destroying the handle).

Whilst FIGS. 3A to 3C, FIGS. 11A and 11B and FIG. 12B show post bundles as being formed by ten posts, bundles of different sizes are also possible. For example, bundles may comprise five posts, or they may comprise twenty posts, or some other number of posts. Additionally, stacks 800, 800a and 800b should be considered to be representative only, and stacks of different heights (i.e. having a different number of rows of bundles) may be employed.

Further, whilst FIGS. 11A and 11B refer to the use of spike 310, the use of other spikes may also be possible.

EXAMPLES

Non-limiting Examples of the device, handle, system and method will now be described, with references to FIGS. 1 to 13.

Example 1

A small bundle of ten Y-posts was made, that was to be used in the creation of a larger stack of posts for storage or transport, using ten Y-posts together with two spikes 10 and two split rings 26. Each of the posts had seven apertures, in the form of elongate slots, in their stalks.

Five Y-posts 30 were positioned on a bench so that the pointed ends were all at the same end, the wings were located on the bench, and so that an edge of one of the wings (i.e. one of the minor flanges) touched the edge of a wing of an adjacent post. This positioned the first five Y-posts so that their stalks extended perpendicularly to the bench, and approximately parallel to each other stalk.

Four Y-posts were then arranged such that, with their pointed ends at the same end of the bench as the already positioned Y-posts, a distal longitudinal edge of their stalks were positioned on the joint formed between the wings of adjacent posts. In this regard, the profile of these four Y-posts were inverted with respect to the five already positioned posts, and their wings rested on the stalks of already positioned posts. The positions of the nine posts were altered slightly so that at least two of the apertures in each stalk was aligned with an aperture in each other stalk.

The spike 10 was held at the looped portion 22 and 24, by inserting a finger through each portion. This made the spike simple to hold and easy to insert. The spike 10 was positioned so that the first end 12 was aligned with the longitudinal axis of the aligned slots, and the first end 12 was pushed through the aperture of each post. The looped portions 22, 24 prevented the second end from passing through the aperture. The tenth and final post was positioned at the end of the nine aligned posts, so that its pointed end was at the same end of the bench as the other posts, and so that apertures in its flange were aligned with the at least two already aligned apertures in the other post. The post was then positioned on the first end of the spike (i.e. so that the first end of the spike was passed through the aperture) and held in place. The split ring 26 was then threaded onto the first end by slightly separating an end 27 and placing the ring onto one part of the U-shaped first end. The ring was then rotated until the other end had been passed, which secured the split ring 26 to the first end 12. This thereby configured the first end such that it could not be withdrawn through the apertures through which it had already passed.

The second spike was then positioned through the second group of aligned apertures, which were at least halfway along the length of the post, and secured in the manner described above.

The resulting bundle was observed to have a packing density of approximately forty percent more than a bundle prepared using thin ductile wire ties. The resulting bundle was also observed to be easier to stack with other bundles, and was generally neater in appearance, than a bundle formed using thin ductile wire ties.

Example 2

A bundle of ten Y-posts were to be transported in the back of a vehicle for use in mending a fence line having a number of broken posts. A handle 500 was employed to move the bundle formed in Example 1.

The foot 508 and leg 504, and the foot 510 and leg 506, of the handle 500 were inserted into the space/cavity 38 formed between the first and second adjacent posts and the ninth and tenth adjacent posts, respectively, in the bundle, by holding the gripping portion 502 of the handle and aligning the legs 504, 506 with the cavities.

The feet 508, 510 and legs 504, 506 were then inserted into the respective cavities. The feet 508, 510 contacted the elongate portion 16 of the spike 10, which caused the feet 508, 510 to deflect at ankles 512, 514 and be urged towards the legs 504, 506. As the legs 504, 506 continued to be inserted into the cavities, the feet 508, 510 continued to be deflected towards the legs 504, 506 until they had passed the elongate portion 16 of spike 10.

As the feet 508, 510 passed the spike 10, they deflected back to their original position, providing a channel that was formed between the feet 508, 510, ankle joints 512, 514 and legs 504, 506. The handle 500 was then pulled in an outwardly direction, as if removal from the cavities was being attempted. This positioned the elongate portion 16 of the spike 10 in the formed channel, and attached the handle 500 to the spike 10.

The gripping portion 502 was gripped by the user and used to lift and move the bundle of posts to the back of a vehicle. The vehicle was then driven to the desired location, and the handle was again used to lift and move the bundle of posts, from the back of the vehicle, onto the ground.

The split ring 26 was then unthreaded and removed from the first end 12 of the spike 10 to which the handle 500 was attached. The user inserted their index and middle fingers into the looped portions 22 and 24 of the spike, and then pulled the spike out of the apertures. The handle 500 was also removed from the cavities. The second spike was removed in a similar manner to the first spike, thereby releasing the bundle of posts for use.

It was observed that the handle provided a fast and simple way to more easily move the bundle of posts. It was also observed that it was much faster to unpack the posts in this bundle (i.e. to release the posts from the bundle for use) than posts secured together with thin ductile wire ties.

Example 3

One thousand six hundred posts were to be stored for future sale as bundles of twenty posts. Each of the posts had eleven apertures, in the form of elongate slots, in their stalks. Three spikes 210, as shown in FIG. 5, were used to secure each bundle of twenty posts, and a handle 700, as shown in FIG. 10, was also used to allow the bundles to be easily moved.

The twenty posts were aligned in similar manner to the ten posts described in Example 1, with the profile of each post being inverted with respect to its adjacent post.

The first end 212 of a first spike 210 was inserted through aligned apertures at one end of the posts. As the first end 212 passed through an aperture, end 220 of the hooked leg portion 218 contacted an edge of the aperture causing the hooked leg portion 218 to deflect towards the elongate portion 216, allowing it to pass through the aperture. Once it had passed through the aperture, the hooked leg portion 218 is angled such that its end 220 engages an edge of the aperture, thereby forcing the leg portion 218 returned to its original position, and was again sized larger than the aperture. This, in conjunction with foot 222, prevented the first end 212 from being withdrawn back through the aperture.

This was repeated with a second spike 210. The second spike 210 was inserted through apertures that were aligned at approximately the middle of the length of the posts.

A third spike 210 was also to be inserted, except at the other end of the posts. However, prior to inserting the spike, the legs 704, 706 of a handle 700 were positioned between adjacent posts. In this example, the gripping portion 702 of handle 700 was required to be resized which required the simple lengthening of telescopic parts of the gripping portion. The gripping portion thereby increased the distance between legs 704, 706 and they were then positioned between the second and third posts and the twenty third and twenty fourth posts in the bundle. The closed loops 708, 710 were aligned with the apertures, and the third spike 210 was passed through the apertures in the twenty five posts, as well as through the closed loops 708, 710 of the handle 700.

Twenty bundles, formed as described above, were layered on top of each other to form a stack 800, with four stacks being formed side-by-side. This provided a neat and uniform stacking arrangement, minimising the floor space required to store the posts, and also allowed the bundles to be easily moved from the stacks.

Example 4

One of the bundles described in Example 3 was used to build a fence. The handle 700 was gripped at gripping portion 702 and used to move the bundle from the stack 800. When the bundle was at its desired location (i.e. on the ground near where the fence was being built), the first end 212 of each of the three spikes 210 was cut off. Each spike 210 was gripped at the second end 214 and withdrawn through the apertures. This also allowed the handle 700 to be removed from the loosened bundle. The twenty five posts were then able to be used for building the fence.

It was observed that the handle provided a fast and simple way to more easily move the bundle of posts. It was also observed that it was much faster to unpack the posts in this bundle (i.e. to release the posts from the bundle for use) than posts secured together with thin ductile wire ties.

Example 5

A bundle of ten Y-posts were to be transported in the back of a vehicle for use in mending a fence line having a number of broken posts. The bundle was formed having a handle 1000.

The bundle was formed slightly differently from the bundle formed in Example 1, in that spike 910 (instead of spike 10) was used to secure the posts together. In a further variation to the bundle formation described in Example 1, once the first five Y-posts were arranged with their wings on the bench, and the next four Y-posts were arranged in an inverted manner so that their wings were positioned on the stalks of the first five Y-posts, the final post was held in position and the first end 912 of the spike 910 was pushed through the aperture of each post (beginning with the so-called 'final' post). Thus, the second bends 954, 956 of the second end 914 abutted the flange of the final post. As in Example 1, the split ring 26 was threaded onto the first end 912, thereby configuring the first end such that it could not be withdrawn through the apertures through which it had already passed.

During formation of the bundle, the foot 1008 and leg 1004, and the foot 1010 and leg 1006, of the handle 1000 were inserted into the space/cavity 38 formed between the first and second adjacent posts and the ninth and tenth adjacent posts, respectively, in the bundle, by holding the gripping portion 1002 of the handle and aligning the legs with the cavities. The feet 1008, 1010 contacted the elongate portion 916 of spike 910, which caused the feet 1008, 1010 to deflect at ankle joints 1012, 1014 and be urged towards the legs 1004, 1006, until the joints 1020, 1022 had passed the elongate portion 916 of the spike 910.

As the feet 1008, 1010 passed the spike 910, they deflected back to their original position, providing a channel that was formed between the legs 1004, 1006 and latches 1016, 1018. The handle 1000 was then pulled in an outwardly direction, as if removal from the cavities was being attempted. As the latches 1016, 1018 1010 contacted the elongate portion 916 of spike 910, the latches 1016, 1018 were caused to deflect at joints 1020, 1022 and be urged towards the feet 1008, 1010, until the ends 1024, 1026 had moved past the elongate portion 916 of spike 910.

As the ends 1024, 1026 moved past the spike 910, they deflected back to their original position, which thereby confined the elongate portion 916 of the spike 910 in the void formed by the legs 1004, 1006, feet 1008, 1010 and latches 1016, 1018, and attached the handle 1000 to the spike 910. The handle 1000 was again pushed into the cavity, until the gripping portion 1002 was adjacent to the ends of the posts, which corresponded to the elongate portion 916 of spike 910 being positioned at the joint 1020, 1022 between feet 1008, 1010 and latches 1016, 1018. This provided a bundle with an incorporated handle, in a slim-line fashion.

The second spike was then positioned through the second group of aligned apertures, which were at least halfway along the length of the post, and secured in the manner described above. Although, it should be noted that the second spike could have been secured prior to the handle being attached to the first spike.

When the bundle of posts was required, the gripping portion 1002 was gripped by the user and used to lift and move the bundle of posts to the back of a vehicle. The gripping portion 1002 was pulled out (i.e. away) from the posts, which caused the elongate portion 916 of the spike 910 to be positioned at the ankle joint 1012, 1014 between legs 1004, 1006 and feet 1008, 1010. This allowed the bundle of posts to be lifted by the user and moved to the back of a vehicle. One the bundle was in the back of the vehicle, the handle 1000 was again pushed into the cavity for transport. The vehicle was then driven to the desired location, and the handle was again used to lift and move the bundle of posts, from the back of the vehicle, onto the ground.

The split ring 26 was then unthreaded and removed from the first end 912 of the spike 910 to which the handle 1000 was attached. The user inserted their index and middle fingers into the recessed portions formed by C-shaped ends 958, 960 of the spike 910, and then pulled the spike out of the apertures. The handle 1000 was also removed from the cavities. The second spike was removed in a similar manner to the first spike, thereby releasing the bundle of posts for use.

It was observed that the incorporated handle provided a fast and simple way to more easily move the bundle of posts, whilst minimising the space required for storage of the bundle. It was also observed that it was much faster to unpack the posts in this bundle (i.e. to release the posts from the bundle for use) than posts secured together with thin ductile wire ties.

It will be understood to persons skilled in the art that many other modifications may be made without departing from the spirit and scope of the device, handle, system and method as disclosed herein.

In the claims which follow and in the preceding description, except where the context requires otherwise due to express language or necessary implication, the word "comprise" or variations thereof such as "comprises" or "comprising" is used in an inclusive sense, i.e. to specify the presence of the stated features but not to preclude the presence or addition of further features in various embodiments of the device, handle, system and method.

The invention claimed is:

1. A device configured to secure two or more posts together, each post being of a type that comprises at least one aperture therethrough, the device comprising two components:
   the first component comprising first and second ends and an elongate portion extending between the ends, wherein:
      the first end is U-shaped such that it is able to be passed through the post apertures, and such that the elongate portion extends through aligned apertures of adjacent posts; and
      the second end is configured to prevent the second end from passing through the apertures; and
   the second component comprising a fastener that is configured to be secured to the U-shaped first end of the first component such that, in use, the fastener prevents the first end of the first component from being withdrawn through an aperture through which it has already been passed.

2. A device as claimed in claim 1 wherein the fastener is removable such that, when removed from the first end, the first end is able to be withdrawn back through an aperture through which it has already been passed.

3. A device as claimed in claim 1 wherein the fastener is a pin, clip, staple, plug, or the like, that is larger than the aperture.

4. A device as claimed in claim 1 further comprising a handle portion to facilitate transport of the two or more posts.

5. A device as claimed in claim 4 wherein the second end is configured to form the handle portion.

6. A device as claimed in claim 4 wherein an end of the handle portion is configured to be attached to the elongate portion or the first end.

7. A device as claimed in claim 1 wherein a length of the elongate portion is configured to be varied.

8. A method of securing two or more posts together with at least one device, each post comprising at least one aperture therethrough, with the device being as claimed in claim 1, the method comprising:
   arranging the two or more posts such that apertures in adjacent posts are aligned;
   passing the first end of the first component through the aligned post apertures; and
   causing the fastener to interact with the U-shaped first end of the first component such that the first end is prevented from being withdrawn back through an aperture through which it has already passed.

9. The method as claimed in claim 8 wherein, when the posts are of a Y- or T-shaped profile, the posts are arranged such that the profiles of adjacent posts are inverted.

10. The method as claimed in claim 8 further comprising attaching a handle to the bundle to facilitate movement thereof.

11. The method as claimed in claim 10 wherein the handle comprises a gripping portion and at least one attachment portion configured to be attached to the bundle.

12. The method as claimed in claim 10 wherein the handle is attached to one or both of:
   at least one aperture of at least one of the posts in the bundle;
   the device securing the bundle together.

13. The method as claimed in claim 12 wherein attaching of the handle to the device comprises positioning the handle at the bundle of posts prior to the first end of the device being passed through the aligned post apertures.

14. The method as claimed in claim 8 wherein two or more devices are employed at different aligned apertures of the posts.

15. The method as claimed in claim 8, the method comprising arranging three or more posts such that apertures in adjacent posts are aligned, the method further comprising passing the first end of the first component through the aligned apertures of all of the three or more posts and causing the fastener to interact with the U-shaped first end of the first component such that the first end is prevented from being withdrawn back through an aperture through which it has already passed.

16. A system for securing three or more posts together to form a post bundle, the system comprising:
   at least one device as claimed in claim 1; and
   three or more posts, each post comprising at least one aperture therethrough;
   wherein the device is configured to secure the three or more posts together such that, when the device secures the three or more posts together, the elongate portion extends through aligned apertures of all of the three or more posts.

17. A system for securing two or more posts together to form a post bundle, the system comprising:
   at least one device as claimed in claim 1; and
   two or more posts, each post comprising at least one aperture therethrough;
   wherein the device is configured to secure the two or more posts together such that, when the device secures the two or more posts together, the elongate portion extends through aligned apertures of adjacent posts.

18. The system as claimed in claim 17 further comprising a handle for moving the post bundle.

19. The system as claimed in claim 18 wherein the handle comprises a gripping portion and at least one attachment portion configured to be attached to the post bundle.

* * * * *